(12) United States Patent
Kim

(10) Patent No.: US 12,610,161 B2
(45) Date of Patent: Apr. 21, 2026

(54) IMAGE SENSOR

(71) Applicant: SAMSUNG ELECTRONICS CO., LTD., Suwon-si (KR)

(72) Inventor: Seoksan Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 68 days.

(21) Appl. No.: 18/797,687

(22) Filed: Aug. 8, 2024

(65) Prior Publication Data

US 2025/0063272 A1    Feb. 20, 2025

(30) Foreign Application Priority Data

Aug. 17, 2023    (KR) ........................ 10-2023-0107915

(51) Int. Cl.
*H04N 25/771* (2023.01)
*H04N 25/773* (2023.01)

(52) U.S. Cl.
CPC ......... *H04N 25/771* (2023.01); *H04N 25/773* (2023.01)

(58) Field of Classification Search
None
See application file for complete search history.

(56) References Cited

U.S. PATENT DOCUMENTS

| | | | |
|---|---|---|---|
| 9,756,271 B2 | 9/2017 | Luo et al. | |
| 11,206,367 B1 | 12/2021 | Shim | |
| 11,375,145 B2 | 6/2022 | Otaka | |
| 11,509,851 B2 | 11/2022 | Shim et al. | |
| 11,653,110 B2 | 5/2023 | Lee et al. | |
| 2009/0213259 A1* | 8/2009 | Su ........................ | H04N 25/616 |
| | | | 348/308 |

FOREIGN PATENT DOCUMENTS

| | | |
|---|---|---|
| JP | 2004-186790 | 7/2004 |
| JP | 4846076 | 12/2011 |
| KR | 10-0247904 | 3/2000 |

* cited by examiner

*Primary Examiner* — Mark T Monk
(74) *Attorney, Agent, or Firm* — Morgan, Lewis & Bockius LLP

(57) ABSTRACT

An image sensor includes a plurality of pixels. Each pixel includes a first photo diode, a floating diffusion node, a first capacitor, a second capacitor, a first sampling transistor, and a second sampling transistor. The first sampling transistor is configured to sample charges from the first capacitor. The second sampling transistor is configured to sample charges from the second capacitor. The image sensor operates the first capacitor to store one of reset charges according to a voltage of the floating diffusion node reset and signal charges according to a voltage of the floating diffusion node in which the photo charges are accumulated, operates the second capacitor to stores the other one of the reset charges and the signal charges and changes types of charges stored in each of the first capacitor and the second capacitor.

20 Claims, 17 Drawing Sheets

IMAGE SENSOR

CROSS-REFERENCE TO RELATED APPLICATIONS

This patent application claims priority under 35 U.S.C. § 119 to Korean Patent Application No. 10-2023-0107915, filed on Aug. 17, 2023, in the Korean Intellectual Property Office, the disclosure of which is incorporated by reference in its entirety herein.

1. Technical Field

The inventive concept relates to an image sensor with an increased lifespan.

2. Discussion of Related Art

An image sensor generates an image of a target object by using photoelectric conversion elements sensitive to the intensity of light reflected by the target object. The image may be a 2-dimensional (2D) image or a 3-dimensional (3D) image. Recently, with the development of the computer industry and the communication industry, the demand for image sensors with higher performance has been increasing in various electronic devices such as digital cameras, camcorders, personal communication systems (PCS), game devices, security cameras, and medical micro cameras.

An image sensor may include a plurality of pixels. Each of the plurality of pixels may include a plurality of capacitors that store charges according to the voltage of a floating diffusion node. However, the capacitors may deteriorate and accordingly the lifespan of the image sensor may be reduced. Thus, there is need for a technique for increasing the lifespan of an image sensor.

SUMMARY

At least one embodiment of the inventive concept provides an image processing device and an image processing method to increase the lifespan of an image sensor by changing the type of charges (e.g., reset charges of a reset signal and signal charges of an image signal) stored in each of a first capacitor and a second capacitor of a pixel of the image sensor.

According to an aspect of the inventive concept, there is provided an image sensor including a plurality of pixels. A pixel among the plurality of pixels includes a first photo diode, a floating diffusion node, a first capacitor, a second capacitor, a first sampling transistor, and a second sampling transistor. The first sampling transistor is configured to sample charges from the first capacitor. The second sampling transistor is configured to sample charges from the second capacitor. The image sensor operates the first capacitor to store one of reset charges according to a voltage of the floating diffusion node reset and signal charges according to a voltage of the floating diffusion node in which the photo charges are accumulated, operates the second capacitor to stores the other one of the reset charges and the signal charges and changes types of charges stored in each of the first capacitor and the second capacitor. The types of charges include the reset charges and the signal charges.

According to an aspect of the inventive concept, there is provided an image sensor including a plurality of pixels. A pixel among the plurality of pixels includes a photo diode, a floating diffusion node, a first sampling transistor, and a second sampling transistor. The image sensor turns on the first sampling transistor to sample one of reset charges according to a voltage of the floating diffusion node reset and signal charges according to a voltage of the floating diffusion node in which the photo charges are accumulated in a first capacitor, turns on the second sampling transistor to sample the other one of the reset charges and the signal charges from a second capacitor, and changes an order in which the first sampling transistor and the second sampling transistor are turned on.

According to an aspect of the inventive concept, there is provided an image sensor including a plurality of pixels. A pixel among the plurality of pixels further includes a photo detection circuit and an analog-to-digital converter. The photo detection circuit includes a photo diode and is configured to generate a pixel signal from photo charges generated by the photo diode. The analog-to-digital converter is configured to convert the pixel signal into a digital signal including a pixel value. The photo detection circuit includes a floating diffusion node configured to accumulate photo charges generated by the photo diode, a first capacitor, a second capacitor, a first sampling transistor configured to sample charges from the first capacitor, and a second sampling transistor configured to sample charges from the second capacitor. The photo detection circuit operates the first capacitor to store one of reset charges according to a voltage of the floating diffusion node and signal charges according to a voltage of the floating diffusion node in which the photo charges are accumulated, operates the second capacitor to store the other one of the reset charges and the signal charges and changes types of charge stored in the first capacitor and the second capacitor. The types of charges include the reset charges and the signal charges.

BRIEF DESCRIPTION OF THE DRAWINGS

Embodiments of the inventive concept will be more clearly understood from the following detailed description taken in conjunction with the accompanying drawings in which:

FIG. 6 is a diagram illustrating charge types being changed for each image capturing operation, according to an embodiment;

FIG. 7 is a diagram illustrating charge types being changed for every frame interval, according to an embodiment;

FIG. 8 is a diagram illustrating charge types being changed based on the number of times a capacitor is used, according to an embodiment;

FIG. 9 is a circuit diagram of a pixel included in an image sensor, according to an embodiment;

FIG. 10 is a timing diagram showing control signals provided to pixels of an image sensor, according to an embodiment;

FIG. 11 is a circuit diagram of a pixel included in an image sensor, according to an embodiment;

DETAILED DESCRIPTION

Figure 1:
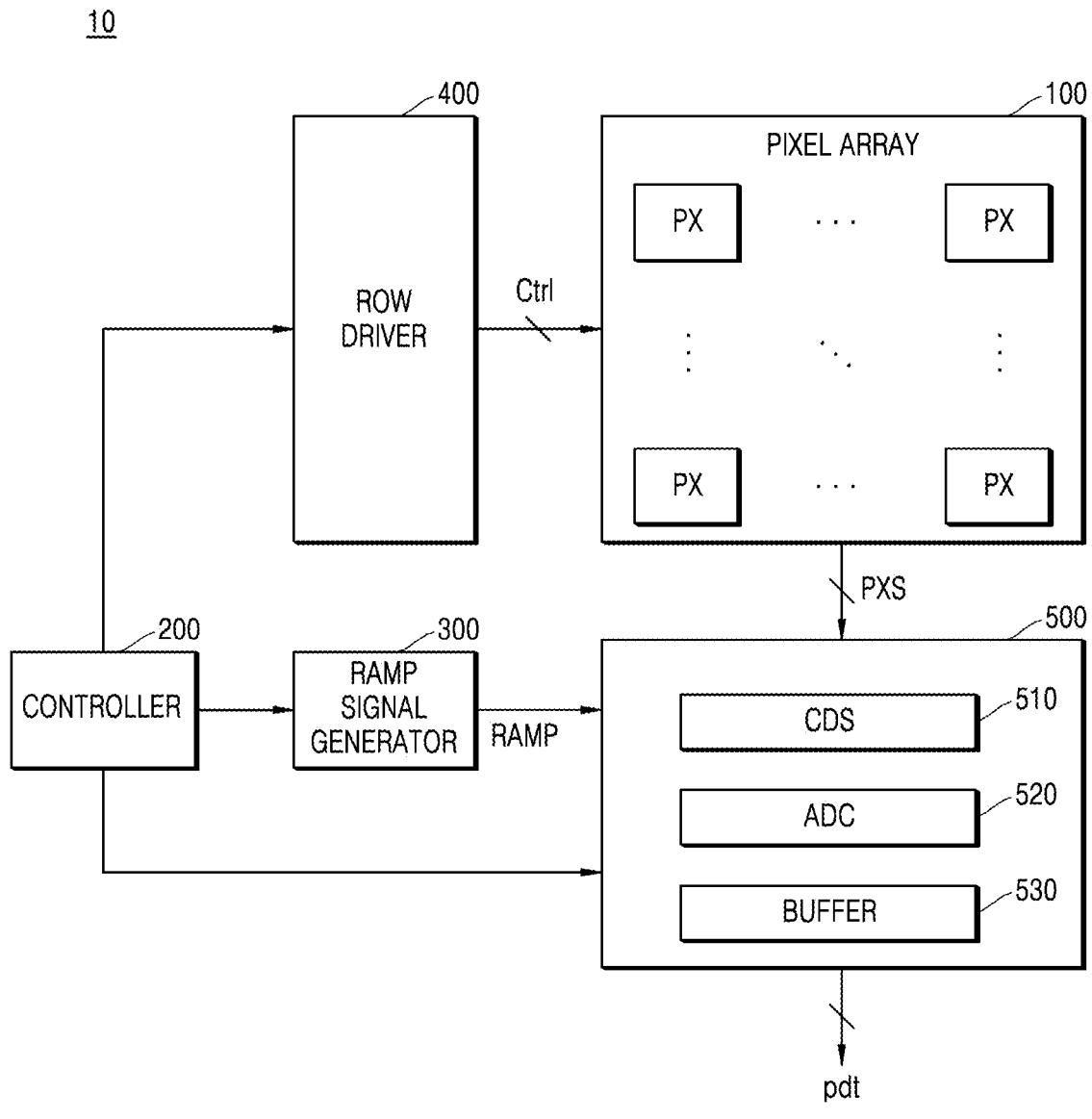
FIG. 1 is a block diagram showing an image sensor according to an embodiment.

FIG. 1 is a block diagram showing an image sensor according to an embodiment.

An image sensor 10 may convert an optical signal of an object incident through an optical lens into image data. The image sensor 10 may be, for example, a charge-coupled device (CCD) image sensor or a complementary metal-oxide semiconductor (CMOS) image sensor.

The image sensor 10 may be installed on an electronic device for sensing an image or light. The electronic device may be implemented as, for example, a personal computer (PC), an Internet of Things (IoT) device, or a portable electronic device. The portable electronic device may include a laptop computer, a mobile phone, a smartphone, a tablet PC, a personal digital assistant (PDA), an enterprise digital assistant (EDA), a digital still camera, a digital video camera, an audio device, a portable multimedia player (PMP), a personal navigation device (PND), an MP3 player, a handheld game console, an e-book device, a wearable device, etc. Also, the image sensor 10 may be installed on an electronic device such as a drone, an advanced drivers assistance system (ADAS), or an electronic device provided as a component of a vehicle, furniture, a manufacturing facility, a door, and various measuring devices.

Referring to FIG. 1, the image sensor 10 may include a pixel array 100, a controller 200 (e.g., a control circuit), a ramp signal generator 300, a row driver 400 (e.g., a driver circuit), and a read-out circuit 500. For example, the read-out circuit 500 may include a correlated-double sampling (CDS) circuit 510, an analog-digital converter (ADC) 520, and a buffer 530 (e.g., an operational amplifier). Hereinafter, the correlated double sampling circuit 510 will be referred to as the CDS circuit 510, and the analog-to-digital converter 520 will be referred to as the ADC 520.

The pixel array 100 may include a plurality of pixels PX. The plurality of pixels PX may output pixel signals PXS to the read-out circuit 500 through corresponding column lines. For example, the plurality of pixels PX may output the pixel signals PXS to the read-out circuit 500 through first to n-th column lines.

The plurality of pixels PX may each include a photoelectric conversion element and may generate the pixel signals PXS corresponding to an object by converting light detected by the photoelectric conversion elements. For example, the photoelectric conversion element may be a light-sensing element including an organic material or an inorganic material, e.g., a photo diode, an organic photo diode, a perovskite photo diode, a photo transistor, a photo gate, a pinned photo diode, etc. According to an example embodiment, the plurality of pixels PX each include a plurality of photoelectric conversion elements.

In the pixel array 100, the plurality of pixels PX may be arranged in a matrix-like pattern including a plurality of rows and a plurality of columns. The plurality of pixels PX may be referred to as active pixel sensors (APS). The pixel array 100 may include the plurality of pixels PX that sense light of different wavelengths. The pixels PX may be arranged in various ways.

Each of the plurality of pixels PX may include a floating diffusion node that accumulates photo charges generated by a photoelectric conversion element. In an embodiment, at least one or each pixel among the plurality of pixels PX includes a first capacitor and a second capacitor that store charges according to the voltage of a floating diffusion node. The first capacitor and the second capacitor may be referred to as storage capacitors. Types of charges that may be stored in the first capacitor and the second capacitor may include reset charges and signal charges. The reset charges may refer to charges according to the voltage of a reset floating diffusion node, and the signal charges may refer to charges according to the voltage of a floating diffusion node in which photo charges accumulate. For example, the reset charges may result from a reset of the floating diffusion node.

The type of charges stored in the first capacitor of a pixel may differ from the type of charges stored in the second capacitor of the same pixel. For example, the first capacitor may store one of reset charges and signal charges, and the second capacitor may store the other one of the reset charges and the signal charges not stored in the first capacitor. For example, in a first frame, a first capacitor of a pixel may store reset charges and a second capacitor of the same pixel may store signal charges (i.e., charges of a second type).

According to an embodiment, the type of charges stored in each of the first capacitor and the second capacitor is changed. In an embodiment, the type of charges stored in the first capacitor and the type of charges stored in the second capacitor are not always the same. For example, in the first frame, reset charges (i.e., charges of a first type) may be stored in the first capacitor of a pixel and signal charges (i.e., charges of a second type) may be stored in the second capacitor of the same pixel; in a second frame, the reset charges may be stored in the second capacitor and the signal charges may be stored in the first capacitor; in a third frame, the first capacitor may store reset charges and the second capacitor may store signal charges, etc. Thus, the first capacitor and second capacitor may continuously alternate between storing charges of different types.

In addition, a micro lens for condensing light may be disposed above each of the plurality of pixels PX or above each pixel group including the pixels PX adjacent to one another. Each of the plurality of pixels PX may detect light in a particular spectral range from light received through a micro lens. For example, the pixel array 100 may include a red pixel for converting light in a red spectral region into an electrical signal, a green pixel for converting light in a green spectral region into an electrical signal, and a blue pixel for converting light in a blue spectral region into an electrical signal. A color filter may be disposed over each of the plurality of pixels PX to transmit light in a particular spectrum region therethrough. However, the inventive concept is not limited thereto, and the pixel array 100 may include pixels that convert light in particular spectral regions other than the red spectral region, the green spectral region, and the blue spectral region into electrical signals.

According to some embodiments, the plurality of pixels PX may have a multi-layer structure. The pixel PX having a multi-layer structure includes a plurality of stacked photoelectric conversion elements that convert light in different spectral regions into electrical signals, and electrical signals respectively corresponding to different colors may generated by the plurality of photoelectric conversion elements. In other words, electrical signals corresponding to a plurality of colors may be output from a single pixel PX.

A color filter array for transmitting light of particular spectrum regions may be disposed over the plurality of pixels PX, and, according to color filters respectively arranged on the pixels, colors that may be sensed by corresponding pixels may be determined. However, the inventive concept is not limited thereto. According to some embodiments, a particular photoelectric conversion element may convert light of a particular wavelength band into electrical signals according to a level of an electrical signal applied to the photoelectric conversion element.

According to an embodiment, as will be described later with reference to FIGS. 9 and 11, each of the plurality of pixels PX may provide conversion gains of 2 or greater. According to some embodiments, as will be described later with reference to FIG. 11, a pixel PX may include two or more photoelectric conversion elements. Each of the plurality of pixels PX may operate in a plurality of modes. According to an embodiment, each of the plurality of pixels PX may operate in a plurality of modes according to at least one of a conversion gain and at least one photoelectric conversion element. For example, each of the plurality of pixels PX may operate in two modes, three modes, or four modes. However, the inventive concept is not limited thereto.

The controller 200 may control the overall operation of the image sensor 10. For example, the controller 200 may control the operation of the row driver 400, the operation of the ramp signal generator 300, and the operation of the read-out circuit 500. According to an embodiment, the controller 200 may control the row driver 400, the ramp signal generator 300, and the read-out circuit 500 such that the image sensor 10 operates in a global shutter mode. For example, the controller 200 may control the row driver 400 to generate a control signal Ctrl.

The row driver 400 may generate control signals Ctrl for controlling the pixel array 100 and provide the control signals Ctrl to the plurality of pixels PX. The row driver 400 may transmit the control signals Ctrl for outputting the pixel signal PXS to the pixel array 100, and the pixel PX may output the pixel signal PXS by operating in response to the control signals Ctrl. According to an embodiment, the row driver 140 determines timings for activating and deactivating the control signals Ctrl for each of the plurality of pixels PX to operate in the global shutter mode. In an embodiment, the row driver 400 generates the control signal Ctrl to change the type of charges to be stored in each of the first capacitor and the second capacitor of a photoelectric conversion element of a pixel.

The row driver 400 may drive the pixel array 100 row-by-row. The control signals Ctrl may be generated in correspondence to respective rows of the pixel array 100 such that the pixel array 100 is controlled row-by-row. The pixel array 100 may output a reset signal and an image signal from one or more selected rows to the read-out circuit 500 in response to the control signals Ctrl provided from the row driver 400.

The ramp signal generator 300 may generate a ramp signal RAMP. The ramp signal RAMP is a signal for converting an analog signal into a digital signal and may be generated in the form of a triangle wave. The ramp signal generator 300 may generate a ramp signal RAMP that increases or decreases at a predetermined slope. The ramp signal generator 300 may transmit the ramp signal RAMP to the read-out circuit 500. For example, the ramp signal RAMP may be provided to the CDS circuit 510.

The read-out circuit 500 may read out the pixel signal PXS from the pixels PX of a row selected by the row driver 400 from among the plurality of pixels PX. Here, the pixel signal PXS may include a reset signal or an image signal (or a sensing signal). A reset signal may refer to reset charges sampled from each of the pixels PX, and an image signal may refer to signal charges sampled from each of the pixels PX.

The read-out circuit 500 may convert reset signals and image signals received from the pixel array 100 through a plurality of column lines into digital signals based on the ramp signal RAMP from the ramp signal generator 300, thereby generating and outputting pixel values pdt corresponding to the plurality of pixels PX row-by-row. According to some embodiments, the read-out circuit 500 may generate the pixel values pdt corresponding to a plurality of modes from the pixel signals PXS corresponding to the plurality of modes.

The CDS circuit 510 may compare the pixel signal PXS received through a column line with the ramp signal RAMP to output a comparison result. When the level of the ramp signal RAMP is identical to the level of the pixel signal PXS, the CDS circuit 510 may output a comparison signal that transitions from a first level (e.g., logic high) to a second level (e.g., logic low). A time point at which the level of the comparison signal transitions may be determined according to the level of the pixel signal PXS.

The CDS circuit 510 may sample and hold the pixel signal PXS provided from the pixel PX according to a CDS method, double-sample the level of a particular noise (e.g., a reset signal) and the level according to an image signal, and generate the comparison signal based on a level corresponding to the difference therebetween. According to some embodiments, the CDS circuit 510 may include one or more comparators. A comparator among the comparators may be implemented by an optional transconductance amplifier (OTA) or a differential amplifier.

The ADC 520 may convert an analog signal received from the CDS circuit 510 into a digital signal. The ADC 520 may convert the pixel signal PXS into the pixel value pdt, which is a digital signal. According to an embodiment, the ADC 520 may include a plurality of ADCs 520 respectively corresponding to a plurality of column lines, and the plurality of ADCs 520 may compare reset signals and image signals received from respectively corresponding column lines with the ramp signal RAMP to generate comparison results and generate pixel values based on the comparison results. For example, the ADC 520 may remove a reset signal from an image signal to generate the pixel value pdt indicating the amount of light detected by the pixel PX. A plurality of pixel values pdt generated by the ADC 520 may be output through the buffer 530.

The buffer 530 may temporarily store the pixel value pdt output from the ADC 520 and then output the same. For example, the buffer 530 may latch the pixel values pdt and sequentially output latched pixel values pdt.

For example, the pixel value pdt output from the read-out circuit 500 may be provided to a signal processor. The signal processor may receive the pixel value pdt from the read-out circuit 500. The signal processor may perform at least one of noise reducing processing, gain adjustment, waveform formulation, interpolation processing, white balance processing, gamma processing, edge emphasis processing, and vining with respect to the pixel value pdt. The signal processor may be included inside the image sensor 10.

However, the inventive concept is not limited thereto. For example, the signal processor may be disposed outside the image sensor 10, or respective parts of the signal processor may be disposed inside and outside the image sensor 10.

Figure 2:
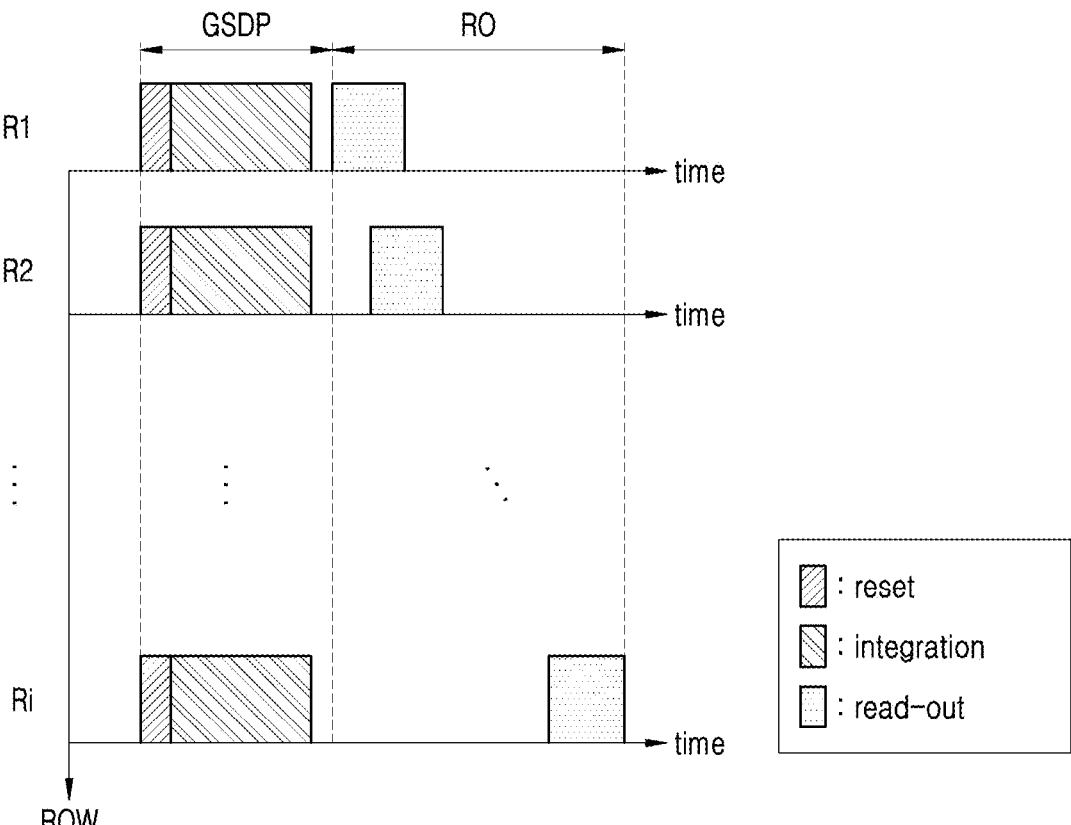
FIG. 2 is a diagram for describing the operation of an image sensor in a global shutter mode, according to an embodiment.

FIG. 2 is a diagram for describing the operation of an image sensor in a global shutter mode, according to an embodiment.

Referring to FIGS. 1 and 2, the image sensor 10 may operate in the global shutter mode. In the global shutter mode, the image sensor 10 may perform a global signal dumping operation during a global signal dumping period GSDP and perform a read-out operation performed during a read-out period RO. The global signal dumping operation may include a reset operation of resetting charges accumulated in a floating diffusion node and an accumulation operation of accumulating photo charges generated by photoelectric conversion elements during an accumulation time.

In the global signal dumping period GSDP, the image sensor 10 may control a reset time during which a reset operation is performed on different rows (e.g., first to i-th rows R1 to Ri (i is a natural number of 2 or greater)) to be identical to an integration time during which the accumulation operation is performed on the different rows. The integration time may refer to the time for substantially accumulating photo charges generated by photoelectric conversion elements (e.g., photo diodes) included in the plurality of pixels PX.

In the read-out period RO, a rolling read-out operation in which read-out operations are sequentially performed row-by-row may be performed. The image sensor 10 may sequentially perform a read-out operation from a first row R1 to an i-th row Ri during a read-out time. The read-out time may refer to the time in which pixel signals corresponding to photo charges generated by the plurality of pixels PX are output from the plurality of pixels PX, respectively.

By operating in the global shutter mode, the image sensor 10 may control photo charge integration times of the pixels PX arranged in different rows to be identical to each other and eliminate image distortion due to the difference between photo charge integration times.

Figure 3:
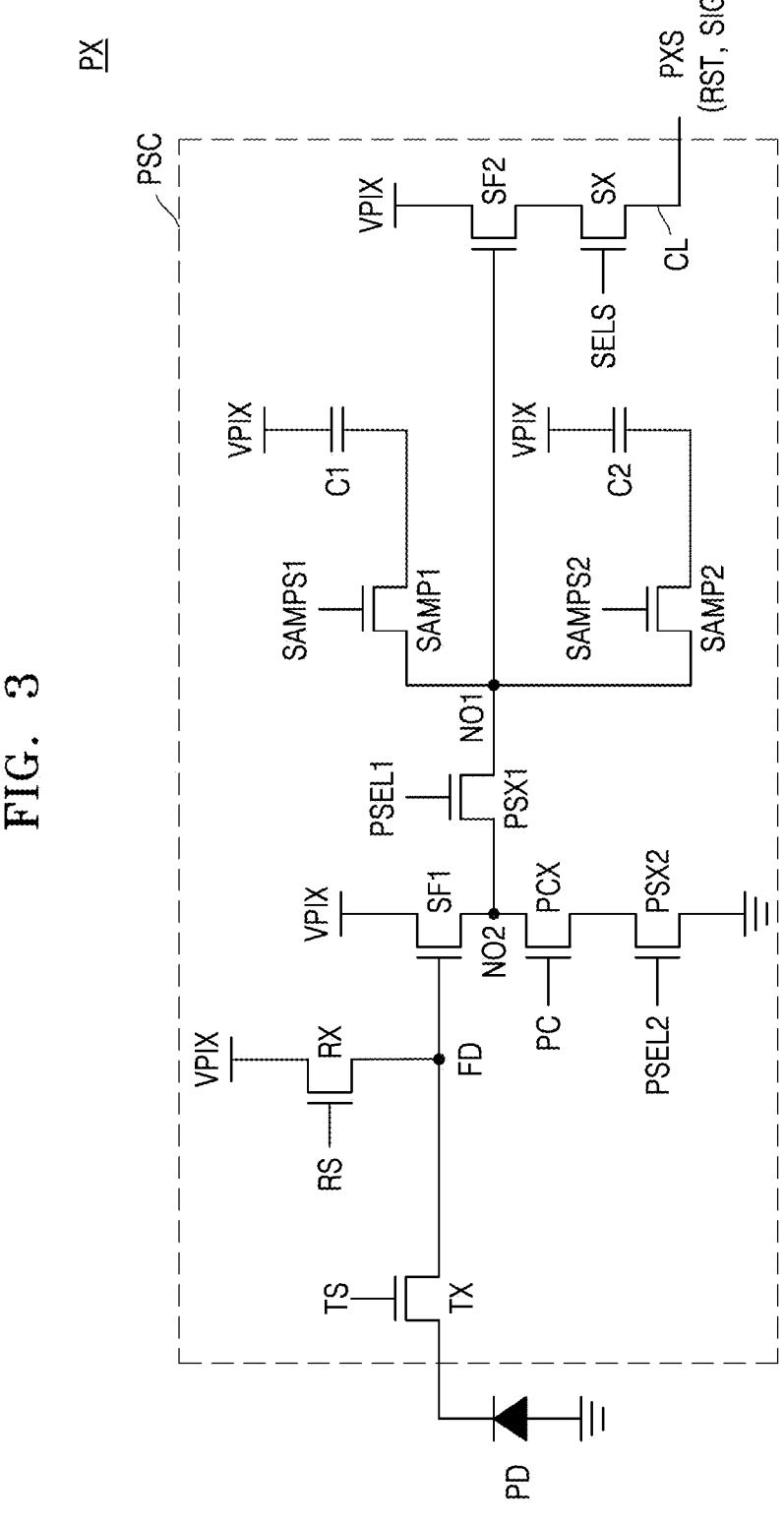
FIG. 3 is a circuit diagram of a pixel included in an image sensor, according to an embodiment.

FIG. 3 is a circuit diagram of a pixel included in an image sensor, according to an embodiment.

Referring to FIG. 3, the pixel PX may include a photo diode PD and a pixel signal generation circuit PSC that generates the pixel signal PXS. Control signals TS, RS, PSEL1, PSEL2, PC, SAMPS1, SAMPS2, and SELS applied to the pixel signal generation circuit PSC may be some of the control signals Ctrl generated by a row driver (e.g., the row driver 400 of FIG. 1).

The photo diode PD may generate photo charges that vary according to the intensity of light. For example, the photo diode PD may generate charges, that is, electrons (i.e., negative charges) and holes (i.e., positive charges), in proportion to the amount of incident light. The photo diode PD is an example of a photoelectric conversion element and may be at least one of a photo transistor, a photo gate, a pinned photo diode (PPD), and a combination thereof.

The pixel signal generation circuit PSC may include a plurality of transistors TX, RX, SF1, PCX, PSX1, PSX2, SAMP1, SAMP2, SF2, and SX, a first capacitor C1, and a second capacitor C2. Charges may be accumulated in the first capacitor C1 and the second capacitor C2 due to a reset operation or charges may be accumulated in the first capacitor C1 and the second capacitor C2 due to a photo charge accumulation operation.

The pixel signal generation circuit PSC may include a transfer transistor TX. The transfer transistor TX may be connected between the photo diode PD and a floating diffusion node FD. A first terminal of the transfer transistor TX may be connected to an output terminal of the photo diode PD, and a second terminal of the transfer transistor TX may be connected to the floating diffusion node FD. The transfer transistor TX may be turned on or off in response to a transfer control signal TS received from the row driver and may transfer photo charges generated by the photo diode PD to the floating diffusion node FD. For example, a gate terminal of the transfer transistor TX may receive the transfer control signal TS. The floating diffusion node FD may have parasitic capacitance.

The pixel signal generation circuit PSC may include a reset transistor RX. The reset transistor RX may reset charges accumulated in the floating diffusion node FD. A pixel voltage VPIX may be applied to a first terminal of the reset transistor RX, and a second terminal of the reset transistor RX may be connected to the floating diffusion node FD. The reset transistor RX may be turned on or off in response to a reset control signal RS received from the row driver, and, as charges accumulated in the floating diffusion node FD are discharged, the floating diffusion node FD may be reset. For example, a gate terminal of the reset transistor RX may receive the reset control signal RS.

The pixel signal generation circuit PSC may include a first source follower SF1. The first source follower SF1 may buffer a signal according to the amount of charges accumulated in the floating diffusion node FD. The first source follower SF1 may be a buffer amplifier. The pixel voltage VPIX may be applied to a first terminal of the first source follower SF1, and the second terminal of the first source follower SF1 may be connected to a second output node NO2. The potential of the floating diffusion node FD is changed according to the amount of charges accumulated in the floating diffusion node FD. As the potential of the floating diffusion node FD is changed, the first source follower SF1 may amplify a change in the potential of floating diffusion node FD to generate an amplified result and output the amplified result to the second output node NO2.

The pixel signal generation circuit PSC may include a pre-charge transistor PCX. A first terminal of the pre-charge transistor PCX may be connected to the second output node NO2, and a second terminal of the pre-charge transistor PCX may be connected to a second pre-charge selection transistor PSX2. For example, the pre-charge transistor PCX may pre-charge the second output node NO2 according to a pre-charge control signal PC received from the row driver. For example, a gate terminal of the pre-charge transistor PCX may receive the pre-charge control signal PC.

The pixel signal generation circuit PSC may include a first pre-charge selection transistor PSX1. The first pre-charge selection transistor PSX1 may be connected between the second output node NO2 and a first output node NO1. The first pre-charge selection transistor PSX1 may be turned on or off in response to a first pre-charge selection control signal PSEL1 received from the row driver and may reset the first output node NO1. For example, a gate terminal of the first pre-charge selection transistor PSX1 may receive the first pre-charge selection control signal PSEL1. The first output node NO1 may have parasitic capacitance.

The pixel signal generation circuit PSC may include the second pre-charge selection transistor PSX2. A first terminal of the second pre-charge selection transistor PSX2 may be connected to the pre-charge transistor PCX, and a ground voltage may be applied to a second terminal of the second pre-charge selection transistor PSX2. The second pre-charge selection transistor PSX2 may be turned on or off in response to a second pre-charge selection control signal PSEL2 received from the row driver to reset the second output node NO2. For example, a gate terminal of the second pre-charge selection transistor PSX2 may receive the second pre-charge selection control signal PSEL2. In other words, the first source follower SF1, the pre-charge transistor PCX, and the second pre-charge selection transistor PSX2 may be connected in series.

The pixel signal generation circuit PSC may include a first sampling transistor SAMP1. A first terminal of the first sampling transistor SAMP1 may be connected to the first output node NO1, and a second terminal of the first sampling transistor SAMP1 may be connected to the first capacitor C1. In response to a first sampling control signal SAMPS1 received from the row driver, the first sampling transistor SAMP1 may be turned on or off and interconnect the first capacitor C1 and the first output node NO1. For example, a gate terminal of the first sampling transistor SAMP1 may receive the first sampling control signal SAMPS1. The first sampling transistor SAMP1 may sample charges of the first capacitor C1.

The pixel voltage VPIX may be applied to a first terminal of the first capacitor C1, and a second terminal of the first capacitor C1 may be connected to the first sampling transistor SAMP1. Charges may be accumulated in the first capacitor C1 according to a switching operation of the first sampling transistor SAMP1. Either reset charges or signal charges may be stored in the first capacitor C1.

The pixel signal generation circuit PSC may include a second sampling transistor SAMP2. A first terminal of the second sampling transistor SAMP2 may be connected to the first output node NO1, and a second terminal of the second sampling transistor SAMP2 may be connected to the second capacitor C2. The second sampling transistor SAMP2 may be turned on or off in response to a second sampling control signal SAMPS2 received from the row driver and interconnect the second capacitor C2 and the first output node NO1. For example, a gate terminal of the second sampling transistor SAMP2 may receive the second sampling control signal SAMPS2. The second sampling transistor SAMP2 may sample charges of the second capacitor C2.

The pixel voltage VPIX may be applied to the first terminal of the second capacitor C2, and the second terminal of the second capacitor C2 may be connected to the second sampling transistor SAMP2. Charges may be accumulated in the second capacitor C2 according to a switching operation of the second sampling transistor SAMP2. The other one of reset charges and signal charges that are not stored in the first capacitor may be stored in the second capacitor C2. For example, in the first frame, reset charges may be stored in the first capacitor C1 and signal charges may be stored in the second capacitor C2.

When only reset charges are stored in the first capacitor C1 and only signal charges are stored in the second capacitor C2 in every frame, a difference may occur in the lifespan of the first capacitor C1 and the lifespan of the second capacitor C2. When reset charges are stored in a capacitor, a voltage difference between both ends of the capacitor may be relatively small. When signal charges are stored in a capacitor, a voltage difference between both ends of the capacitor may be relatively large. When charges with a large voltage difference are continuously stored in a capacitor, the lifespan of the capacitor may be shortened. For example, when only reset charges are stored in the first capacitor C1 and only signal charges are stored in the second capacitor C2 in each frame, the lifespan of the second capacitor C2 may become shorter than that of the first capacitor C1. Due to the deterioration of the lifespan of the second capacitor C2, the lifespan of the image sensor may also be shortened. An image sensor according to an embodiment of the inventive concept adjusts the lifespans of the first capacitor C1 and the second capacitor C2 to be similar to each other by changing the types of charges stored in the first capacitor C1 and the second capacitor C2. For example, the lifespan of the second capacitor C2 may be increased, and thus the lifespan of the image sensor may be increased.

According to an embodiment, the types of charges stored in the first capacitor C1 and the second capacitor C2 are changed. The types of charges may include reset charges and signal charges. Not only reset charges are stored in the first capacitor C1 and not only signal charges are stored in the second capacitor C2 in every frame. Rather, the types of charges stored in the first capacitor C1 and the second capacitor C2 may be changed in at least one of the frames. For example, in the first frame, reset charges may be stored in the first capacitor C1 and signal charges may be stored in the second capacitor C2. In a second frame, reset charges may be stored in the second capacitor C2 and signal charges may be stored in the first capacitor C1. In an embodiment, the first frame occurs during a first period, the second frame occurs during the second period, and the second period occurs immediately after the first period.

According to an embodiment, the order in which the first sampling transistor SAMP1 and the second sampling transistor SAMP2 are turned on is changed. By changing the order in which the first sampling transistor SAMP1 and the second sampling transistor SAMP2 are turned on, the type of charges stored in the first capacitor C1 and the second capacitor C2 may be changed. For example, in the first frame, the first sampling transistor SAMP1 may be turned on first to sample reset charges from the first capacitor C1, and then the second sampling transistor SAMP2 may be turned on to sample signal charges from the second capacitor C2. In the second frame, the second sampling transistor SAMP2 may be turned on first to sample reset charges from the second capacitor C2, and then the first sampling transistor SAMP1 may be turned on to sample signal charges from the first capacitor C1. For example, the order in which the first sampling transistor SAMP1 and the second sampling transistor SAMP2 are turned on may be changed on occasion to ensure the first capacitor C1 and the second capacitor C2 have the same lifespan.

The pixel signal generation circuit PSC may include a second source follower SF2 and a selection transistor SX. The pixel voltage VPIX may be applied to a first terminal of the second source follower SF2, and a second terminal of the second source follower SF2 may be connected to the selection transistor SX. The second source follower SF2 may amplify and output a change of the potential at the first output node NO1.

A first terminal of the selection transistor SX may be connected to the second source follower SF2, and a second terminal of the selection transistor SX may be connected to a column line CL. The selection transistor SX may be turned on or off in response to a selection control signal SELS received from the row driver. For example, a gate terminal of the selection transistor SX may receive the selection control signal SELS. When the selection transistor SX is turned on, a reset signal RST corresponding to a reset operation may be output to the column line CL or an image signal SIG corresponding to a charge accumulation operation may be output.

The second source follower SF2 and the selection transistor SX may output the pixel signal PXS according to a change of the potential at the first output node NO1 to the column line CL and output the pixel signal PXS corresponding to one of the amount of charges stored in the first capacitor C1 and the amount of charges stored in the second capacitor C2 through the column line CL.

Figure 4:
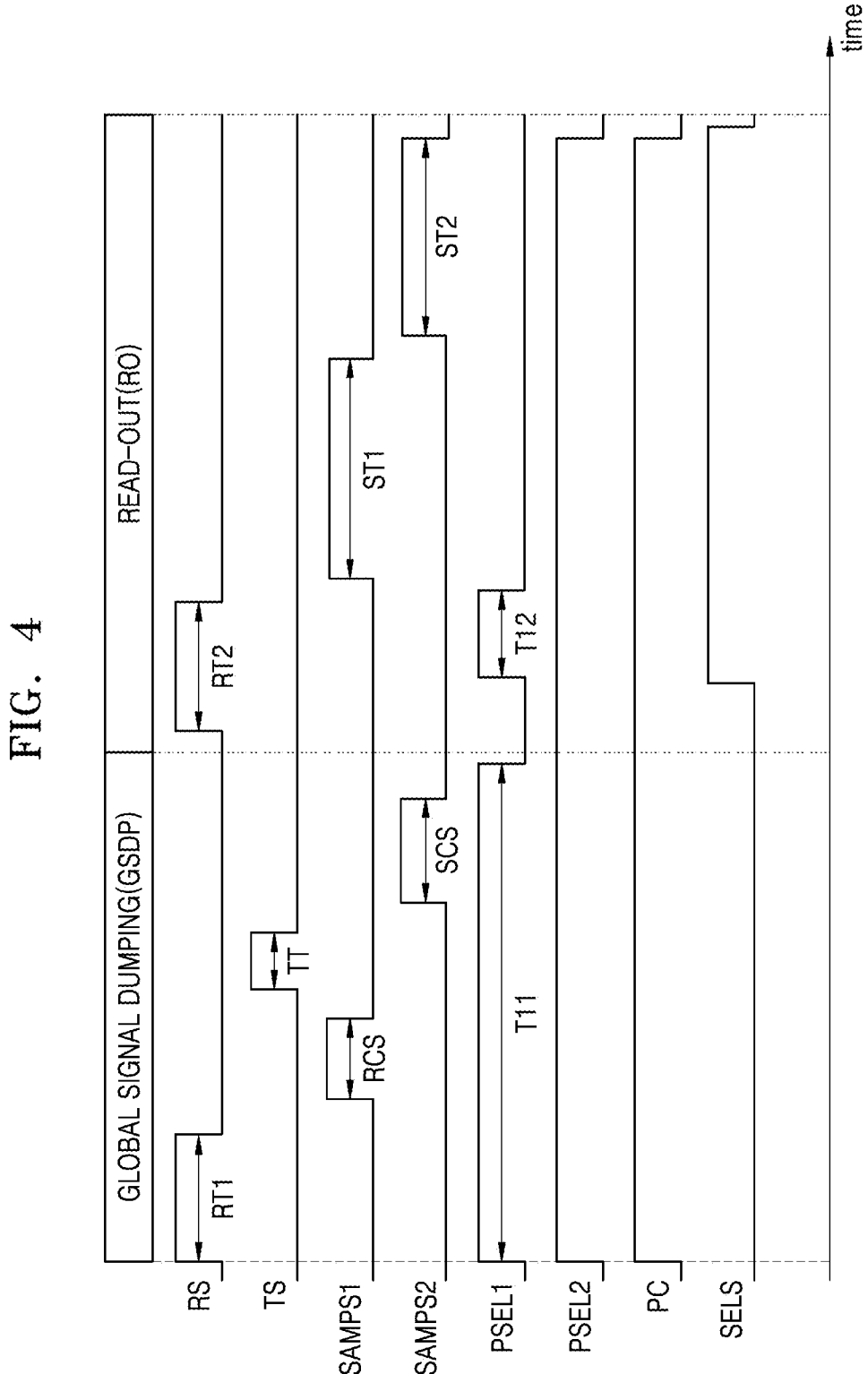
FIG. 4 is a timing diagram showing a control signal provided to a pixel of an image sensor, according to an embodiment.

FIG. 4 is a timing diagram showing a control signal provided to a pixel of an image sensor, according to an embodiment. Pixels arranged in the same row may be provided with the same control signals. Control signals described with reference to FIG. 4 may be provided to the pixel PX described above with reference to FIG. 3 and will be described below with reference to FIG. 3 for convenience of explanation.

Referring to FIGS. 3 and 4, one frame (or frame period) may include the global signal dumping period GSDP and the read-out period RO. Operations described below may be performed in the global signal dumping period GSDP. The reset control signal RS may transition from a second level (e.g., low level) to a first level (e.g., high level), maintain the first level for a first reset time RT1, and then maintain a low level. When the reset transistor RX is turned on by a high-level reset control signal RS, the floating diffusion node FD may be reset (reset operation). For example, the voltage of the floating diffusion node FD may be reset to the pixel voltage VPIX.

After the reset control signal RS transitions from a high level to a low level, the first sampling control signal SAMPS1 may transition from a low level to a high level and maintain the high level during a reset settling time RCS. When the first sampling transistor SAMP1 is turned on by the first sampling control signal SAMPS1 having the high-level, reset charges may be sampled from the first capacitor C1 connected to the first output node NO1.

After the first sampling control signal SAMPS1 transitions from a high level to a low level, the transfer control signal TS may transition from a low level to a high level and maintain the high level for an integration time TT. When the transfer transistor TX is turned on by the transfer control signal TS having the high-level, photo charges generated by the photo diode PD may be accumulated in the floating diffusion node FD (accumulation operation). For example, the voltage of the floating diffusion node FD may gradually decrease from the pixel voltage VPIX according to the amount of accumulated charges.

After the transfer control signal TS transitions from a high level to a low level, the second sampling control signal SAMPS2 may transition from a low level to a high level and maintain the high level during a signal settling time SCS. When the second sampling transistor SAMP2 is turned on by the second sampling control signal SAMPS2 having the high-level, signal charges may be sampled from the second capacitor C2 connected to the first output node NO1.

The first pre-charge selection control signal PSEL1 may transition from a low level to a high level and maintain the high level during the global signal dumping period GSDP. For example, the first pre-charge selection control signal PSEL1 may maintain the high level for a first time period T11. The second pre-charge selection control signal PSEL2 may maintain a high level during the global signal dumping period GSDP and the read-out period RO.

The pre-charge control signal PC may transition from a low level to a high level before the first sampling control signal SAMPS1 transitions from a low level to a high level. The pre-charge control signal PC may maintain a high level during the global signal dumping period GSDP and the read-out period RO. The pre-charge transistor PCX may be turned on by the high-level pre-charge control signal PC and the first output node NO1 may be pre-charged.

In the global signal dumping period GSDP, the selection control signal SELS may maintain a low level.

Operations described below may be performed in the read-out period RO. In the read-out period RO, the pre-charge control signal PC may maintain a high level. In the read-out period RO, the second pre-charge selection control signal PSEL2 may maintain a high level.

The reset control signal RS may transition from a low level to a high level and then maintain the high level for a second reset time RT2. Also, the first pre-charge selection control signal PSEL1 may transition from a low level to a high level, and the first pre-charge selection control signal PSEL1 may maintain the high level for a second time period T12.

The first output node NO1 may be reset by the high-level reset control signal RS, the high-level first pre-charge selection control signal PSEL1, and the high-level second pre-charge selection control signal PSEL2. For example, the first output node NO1 may be reset to the pixel voltage VPIX.

When an output node reset operation ends, the first sampling control signal SAMPS1 may transition from a low level to a high level and maintain the high level for a first settling time ST1. At this time, in the first settling time ST1 during which the first sampling control signal SAMPS1 maintains the high level, the selection control signal SELS may be at a high level, the selection transistor SX may be turned on, and the reset signal RST corresponding to charges sampled from the first capacitor C1 according to a reset operation may be output through the column line CL.

After the first settling time ST1 has elapsed and the first sampling control signal SAMPS1 transitions from a high level to a low level, the second sampling control signal SAMPS2 may transition from a low level to a high level and maintain the high level during a second settling time ST2. At this time, in the second settling time ST2 during which the second sampling control signal SAMPS2 maintains the high level, the selection control signal SELS may be at a high level, the selection transistor SX may be turned on, and the image signal SIG corresponding to charges sampled from the second capacitor C2 according to an accumulation operation may be output through the column line CL.

FIG. 4 shows that, after the first sampling control signal SAMPS1 transitions from a low level to a high level in the read-out period RO, the second sampling control signal SAMPS2 transitions from a low level to a high level. However, the image sensor according to the inventive concept is not limited thereto. After the second sampling control signal SAMPS2 transitions from a low level to a high level in the read-out period RO, the first sampling control signal SAMPS1 may transition from a low level to a high level.

Figure 5:
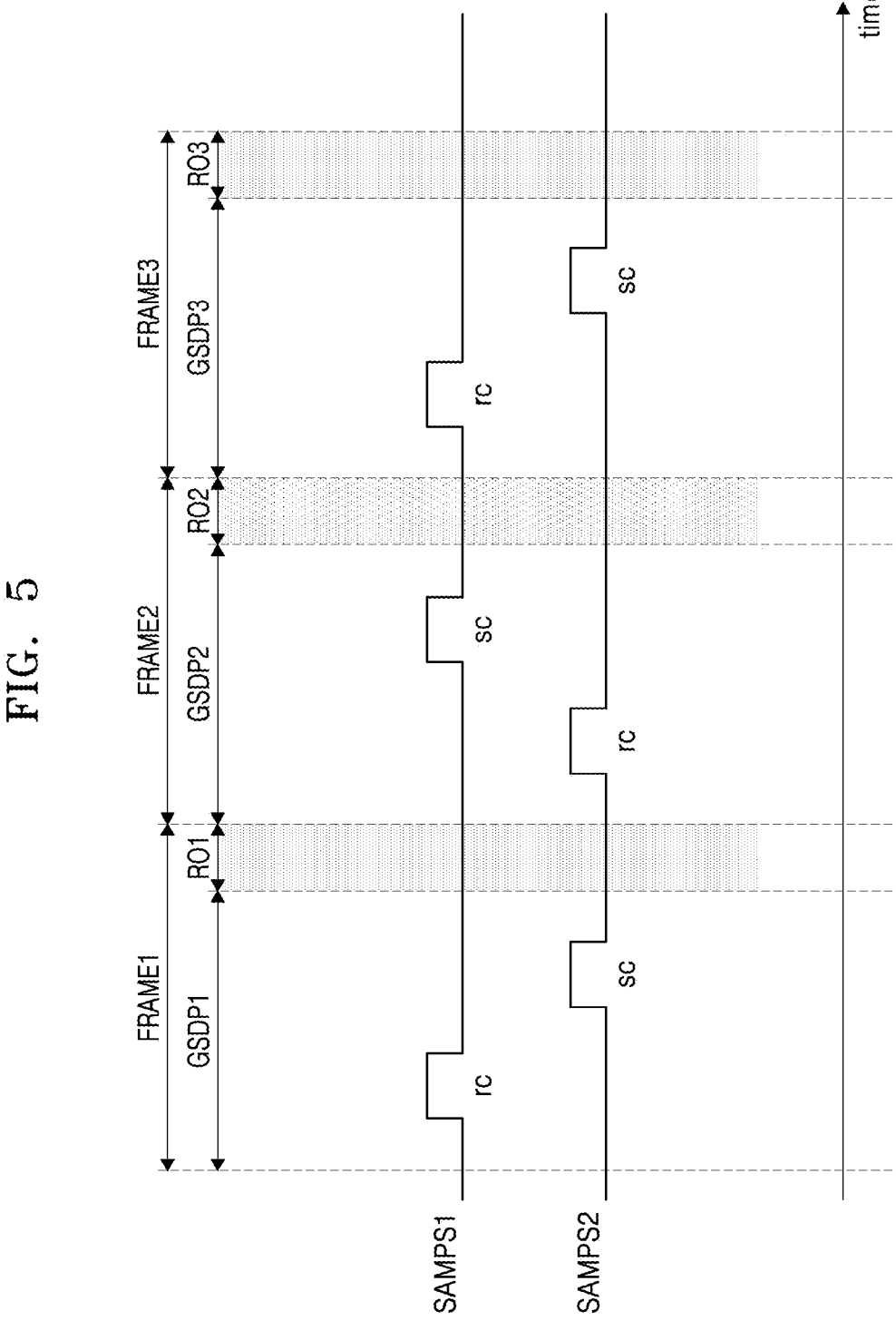
FIG. 5 is a diagram illustrating charge types being changed for each frame, according to an embodiment.

FIG. 5 is a diagram illustrating charge types changed for each frame, according to an embodiment. Hereinafter, descriptions are given with reference to FIG. 3.

Referring to FIGS. 3 and 5, the types of charges stored in the first capacitor C1 and the second capacitor C2 may be changed. The types of charges stored in the first capacitor C1 and the second capacitor C2 may be changed based on frames. According to an embodiment, the types of charges stored in the first capacitor C1 and the second capacitor C2 of a given signal generation circuit PSC are changed for each frame. The order in which the first sampling transistor SAMP1 and the second sampling transistor SAMP2 are turned on may be changed for each frame, and the types of charges stored in the first capacitor C1 and the second capacitor C2 may be changed for each frame.

FIG. 5 shows a first frame (FRAME1), a second frame (FRAME2), and a third frame (FRAME3) for convenience of explanation and shows the first sampling control signal SAMPS1 and the second sampling control signal SAMPS2 from among control signals. Control signals omitted from FIG. 5 may operate similarly as or identically to those in FIG. 4. However, the inventive concept is not limited to those shown in FIG. 5. A second frame is continuous to and follows a first frame, and a third frame is continuous to and follows the second frame.

The first frame may include a first global signal dumping period GSDP1 and a first read-out period RO1. The second frame may include a second global signal dumping period GSDP2 and a second read-out period RO2. The third frame may include a third global signal dumping period GSDP3 and a third read-out period RO3. Although the timing diagram of control signals in a read-out period is omitted from FIG. 5 for convenience of explanation, control signals in the read-out period may operate similarly as or identically to those in FIG. 4.

In the first global signal dumping period GSDP1 of the first frame, the first sampling control signal SAMPS1 may transition from a low level to a high level. The first sampling transistor SAMP1 may be turned on by the first sampling control signal SAMPS1 having the high-level. When the first sampling transistor SAMP1 is turned on, reset charges rc of the reset floating diffusion node FD may be stored in the first capacitor C1. In the first frame, the reset charges rc may be stored in the first capacitor C1, and the voltage difference between both ends of the first capacitor C1 may be relatively small.

After the first sampling control signal SAMPS1 transitions from a high level to a low level, the second sampling control signal SAMPS2 may transition from a low level to a high level. The second sampling transistor SAMP2 may be turned on by the high-level second sampling control signal SAMPS2. When the second sampling transistor SAMP2 is turned on, signal charges sc of the floating diffusion node FD in which photo charges are accumulated may be stored in the second capacitor C2. In the first frame, the signal charges sc may be stored in the second capacitor C2, and the voltage difference between both ends of the second capacitor C2 may be relatively large. In the first frame, the voltage differences between both ends of each of the first capacitor C1 and the second capacitor C2 may be different from each other.

In the second global signal dumping period GSDP2 of the second frame, the second sampling control signal SAMPS2 may first transition from a low level to a high level. The second sampling transistor SAMP2 may be turned on by the second sampling control signal SAMPS2 having the high-level, and the reset charges re may be stored in the second capacitor C2.

After the second sampling control signal SAMPS2 transitions from a high level to a low level, the first sampling control signal SAMPS1 may transition from a low level to a high level. The first sampling transistor SAMP1 may be turned on by the first sampling control signal SAMPS1 having the high-level, and the signal charges sc may be stored in the first capacitor C1. The types of charges stored in the first capacitor C1 and the second capacitor C2 may be changed for each frame. The reset charges re may be stored in the first capacitor C1 in the first frame and the signal charge sc may be stored in the first capacitor C1 in the second frame. In the second capacitor C2, the signal charges sc may be stored in the first frame and the reset charges rc may be stored in the second frame.

In the third global signal dumping period GSDP3 of the third frame, the first sampling control signal SAMPS1 first transitions from a low level to a high level, the first sampling transistor SAMP1 may be turned on, and the reset charges re may be stored in the first capacitor C1.

After the first sampling control signal SAMPS1 transitions from a high level to a low level, the second sampling control signal SAMPS2 may transition from a low level to a high level. The second sampling transistor SAMP2 may be turned on, and the signal charges sc may be stored in the second capacitor C2.

Since the types of charges stored in the first capacitor C1 and the second capacitor C2 are changed, the lifespan of the second capacitor C2 (or the first capacitor C1) may be increased as compared to the case where only the signal charges sc are stored in the second capacitor C2 (or the first capacitor C1). Therefore, the overall lifespan of the image sensor may be increased. For example, the two capacitors of a signal generation circuit PSC of a given pixel PX may alternate between storing reset charges rc and signal charges sc so that the same capacitor does not continuously store charges of the same type.

Figure 6:
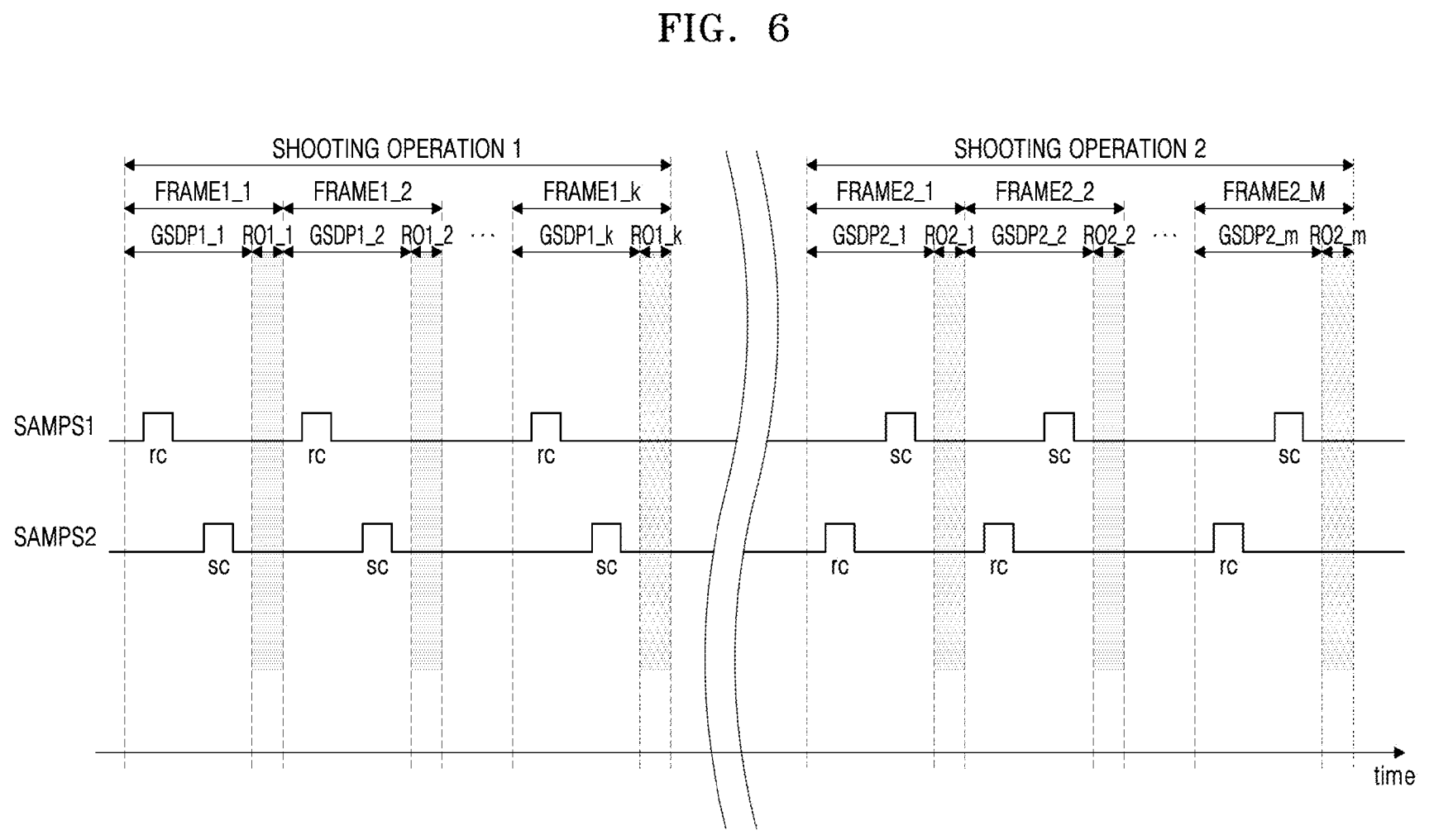

FIG. 6 is a diagram illustrating charge types changed for each image capturing operation, according to an embodiment. Hereinafter, descriptions are given with reference to FIG. 3. Descriptions identical to those already given above will be omitted.

Referring to FIGS. 3 and 6, the types of charges stored in the first capacitor C1 and the second capacitor C2 may be changed. According to an embodiment, the types of charges stored in the first capacitor C1 and the second capacitor C2 may be changed for each frame in which the image sensor starts an image capturing operation. The types of charges stored in each of the first capacitor C1 and the second capacitor C2 may be changed for every image capturing operation of the image sensor.

A first image capturing operation (e.g., SHOOTING OPERATION 1) may include k frames, where k is a positive integer. A second image capturing operation (e.g., SHOOTING OPERATION 2) may include m frames, where m is a positive integer. The second image capturing operation may refer to an image capturing operation that follows the first image capturing operation. The first image capturing operation and the second image capturing operation may include the same number of frames or may include different numbers of frames. In an embodiment, the frequency at which the first image capturing operation is performed differs from the frequency at which the second image capturing operation is performed.

In the first image capturing operation, the first frame (FRAME1_1) may include a first global signal dumping period GSDP1_1 and a first read-out period RO1_1. The second frame (FRAME1_2) may include a second global signal dumping period GSDP1_2 and a second read-out period RO1_2. A k-th frame (FRAME_1_$k$) may include a k-th global signal dumping period GSDP1_$k$ and a k-th read-out period RO1_$k$.

In each of k frames included in the first image capturing operation, the reset charges rc may be stored in the first capacitor C1 and the signal charges sc may be stored in the second capacitor C2. In each frame during the first image capturing operation, after the first sampling control signal SAMPS1 transitions from a low level to a high level, the second sampling control signal SAMPS2 may transition from a low level to a high level. In each frame during the first image capturing operation, after the first sampling transistor SAMP1 is turned on and the reset charges rc are stored in the first capacitor C1, the second sampling transistor SAMP2 may be turned on and the signal charges sc may be stored in the second capacitor C2. In the first image capturing operation, the reset charges re corresponding to a relatively small voltage difference between both ends of a capacitor may be stored in the first capacitor C1 for each frame. In the first image capturing operation, the signal charges sc corresponding to a relatively large voltage difference between both ends of a capacitor may be stored in the second capacitor C2 for each frame.

In the second image capturing operation, the first frame (FRAME2_1) may include a first global signal dumping period GSDP2_1 and a first read-out period RO2_1. The second frame (FRAME2_2) may include a second global signal dumping period GSDP2_2 and a second read-out period RO2_2. An m-th frame (FRAME2_M) may include an m-th global signal dumping period GSDP2_m and an m-th read-out period RO2_m.

In each of m frames included in the second image capturing operation, the reset charges rc may be stored in the second capacitor C2 and the signal charges sc may be stored in the first capacitor C1. In each frame during the second image capturing operation, after the second sampling control signal SAMPS2 may transition from a low level to a high level, the first sampling control signal SAMPS1 may transition from a low level to a high level. In each frame during the second image capturing operation, after the second sampling transistor SAMP2 is turned on and the reset charges re are stored in the second capacitor C2, the first sampling transistor SAMP1 may be turned on and the signal charges sc may be stored in the first capacitor C1. In the second image capturing operation, the reset charges re may be stored in the second capacitor C2 for each frame. In the second image capturing operation, the signal charges sc may be stored in the first capacitor C1 for each frame. Since the types of charges stored in the first capacitor C1 and the second capacitor C2 are changed for each image capturing operation, the overall lifespan of the image sensor may be increased.

Figure 7:
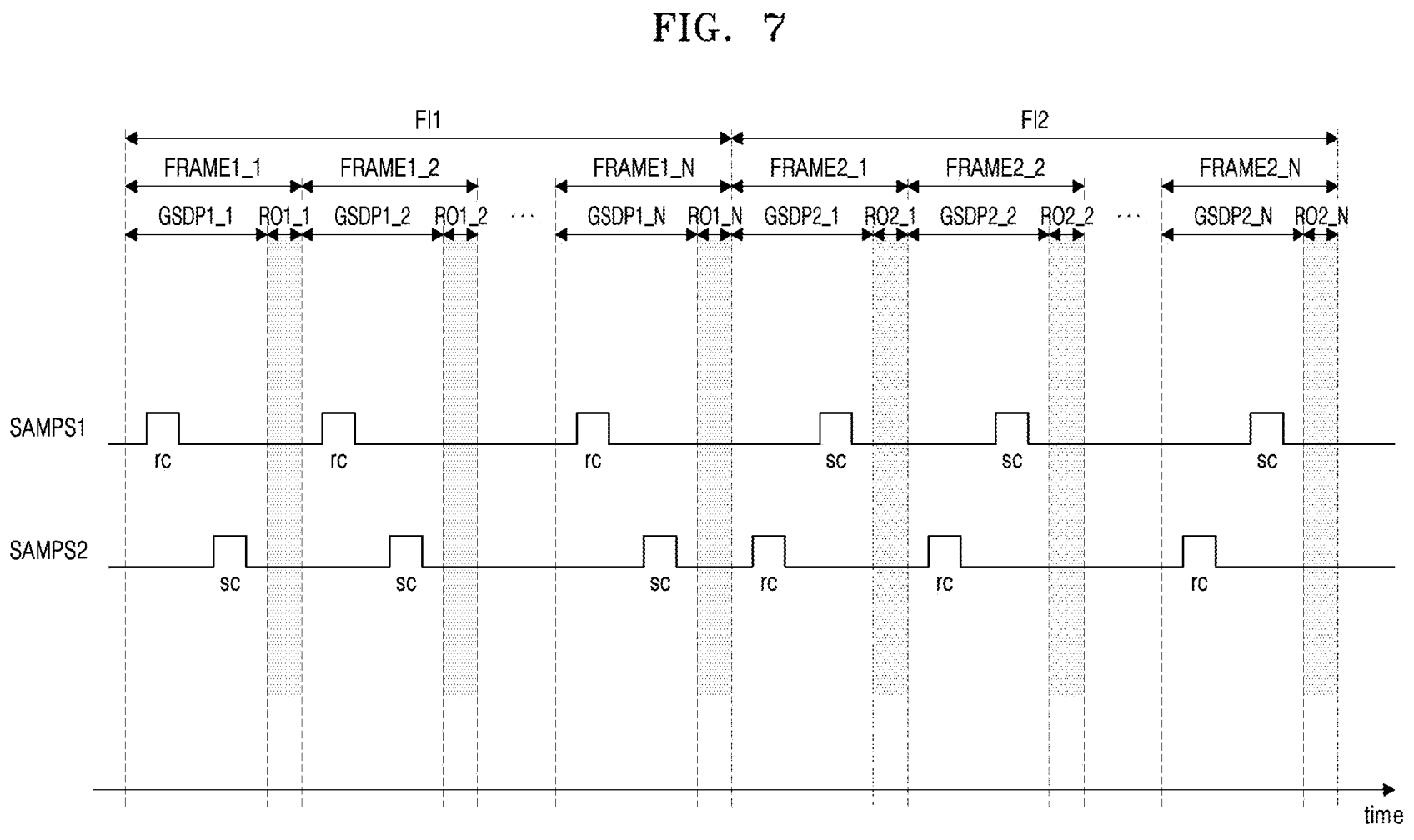

FIG. 7 is a diagram illustrating charge types changed for every frame interval, according to an embodiment. Hereinafter, descriptions are given with reference to FIG. 3. Descriptions identical to those already given above will be omitted.

Referring to FIGS. 3 and 7, the types of charges stored in the first capacitor C1 and the second capacitor C2 may be changed. According to an embodiment, the types of charges stored in the first capacitor C1 and the second capacitor C2 may be changed for every N frames (N is a positive number of 2 or greater). The types of charges stored in the first capacitor C1 and the second capacitor C2 may be changed for every N frames.

A first frame interval FI1 may include N frames. A second frame interval FI2 may include N frames. The first frame interval FI1 and the second frame interval FI2 may include the same number of frames. The second frame interval FI2 may be a frame interval that follows the first frame interval FI1.

In the first frame interval FI1, the first frame may include the first global signal dumping period GSDP1_1 and the first read-out period RO1_1. The second frame may include the second global signal dumping period GSDP1_2 and the second read-out period RO1_2. An N-th frame (FRAME1_N) may include an N-th global signal dumping period GSDP1_N and an N-th read-out period RO1_N.

In each of N frames included in the first frame interval FI1, the reset charges rc may be stored in the first capacitor C1 and the signal charges sc may be stored in the second capacitor C2. In each frame during the first frame interval FI1, after the first sampling control signal SAMPS1 transitions from a low level to a high level, the second sampling control signal SAMPS2 may transition from a low level to a high level. In each frame during the first frame interval FI1, after the first sampling transistor SAMP1 is turned on and the reset charges re are stored in the first capacitor C1, the second sampling transistor SAMP2 may be turned on and the signal charges sc may be stored in the second capacitor C2. In the first frame interval FI1, the reset charges re corresponding to a relatively small voltage difference between both ends of a capacitor may be stored in the first capacitor C1 for each frame. In the first frame interval FI1, the signal charges sc corresponding to a relatively large voltage difference between both ends of a capacitor may be stored in the second capacitor C2 for each frame.

In the second frame interval FI2, the first frame may include the first global signal dumping period GSDP2_1 and the first read-out period RO2_1. The second frame may include the second global signal dumping period GSDP2_2 and the second read-out period RO2_2. An N-th frame (FRAME2_N) may include an N-th global signal dumping period GSDP2_N and an N-th read-out period RO2_N.

In each of N frames included in the second frame interval FI2, the reset charges rc may be stored in the second capacitor C2 and the signal charges sc may be stored in the first capacitor C1. In each frame during the second frame interval FI2, after the second sampling control signal SAMPS2 transitions from a low level to a high level, the first sampling control signal SAMPS1 may transition from a low level to a high level. In each frame during the second frame interval FI2, after the second sampling transistor SAMP2 is turned on and the reset charges re are stored in the second capacitor C2, the first sampling transistor SAMP1 may be turned on and the signal charges sc may be stored in the first capacitor C1. In the second frame interval FI2, the reset charges re corresponding to a relatively small voltage difference between both ends of a capacitor may be stored in the second capacitor C2 for each frame. In the second frame interval FI2, the signal charges sc corresponding to a relatively large voltage difference between both ends of a capacitor may be stored in the first capacitor C1 for each frame.

Although FIG. 7 shows that the reset charges re are stored in the first capacitor C1 and the signal charges sc are stored in the second capacitor C2 in the first frame interval FI1, the inventive concept is not limited thereto. For example, the reset charges re may be stored in the second capacitor C2 and the signal charges sc may be stored in the first capacitor C1.

Figure 8:
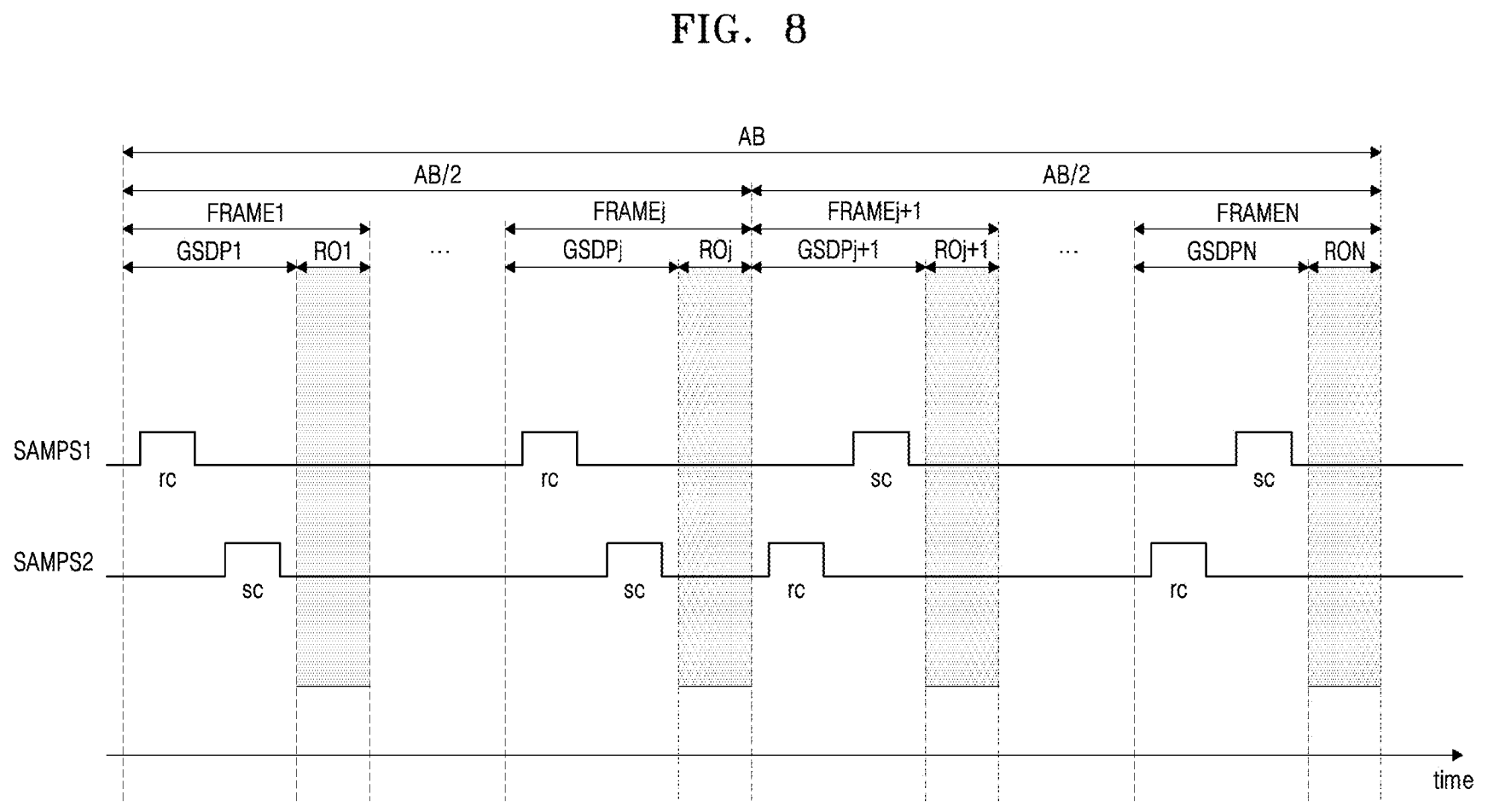

FIG. 8 is a diagram illustrating charge types changed based on the number of times a capacitor is used, according to an embodiment. Hereinafter, descriptions will be given with reference to FIGS. 1 and 3 together. Descriptions identical to those already given above will be omitted.

Referring to FIGS. 1, 3 and 8, the types of charges stored in the first capacitor C1 and the second capacitor C2 may be changed. According to an embodiment, the types of charges stored in the first capacitor C1 and the second capacitor C2 of a pixel signal generation circuit PSC of a pixel PX is changed based on the number of uses of at least one of the first capacitor C1 and the second capacitor C2.

According to an embodiment, the controller 200 may calculate the number of uses of at least one of capacitors included in the pixel PX. For example, when each of the plurality of pixels PX includes the first capacitor C1 and the second capacitor C2, the controller 200 may calculate the number of uses of at least one of the first capacitor C1 and the second capacitor C2. The controller 200 may control the operation of the row driver 400 according to the number of uses of a capacitor. The number of uses of a capacitor may refer to the number of times charges are stored in the capacitor. For example, the number of uses of a capacitor may refer to the number of times the signal charges sc are stored in the capacitor up to a current time point.

The controller 200 may control the row driver 400 to generate the control signal Ctrl for controlling turn-on and turn-off of sampling transistors of the pixel PX. The controller 200 may determine the numbers of times sample transistors SAMP1 and SAMP2 of each of the pixels PX are turned on and turned off. The controller 200 may calculate the number of uses of a capacitor based on the numbers of times the sample transistors SAMP1 and SAMP2 are turned on and turned off. For example, the controller 200 may calculate the number of times the signal charges sc are stored in a capacitor based on the numbers of times and timings that the sample transistors SAMP1 and SAMP2 are turned on and turned off.

The controller 200 may control the row driver 400 to change the type of charges stored in the capacitor based on the calculated number of uses.

The type of charges stored in a capacitor may be changed based on a lifespan AB and the number of uses of the capacitor. The lifespan AB of a capacitor may refer to the number of times the capacitor may store charges until the capacitor is deteriorated and becomes no longer capable of storing charges.

For example, when the number of uses of at least one of the first capacitor C1 and the second capacitor C2 reaches or exceeds half of the lifespan AB, the type of charges to be stored therein may be changed. Although descriptions of FIG. 8 are given under the assumption that the type of charges stored in the first capacitor C1 and the second capacitor C2 are changed based on the number of uses of the second capacitor C2, the inventive concept is not limited thereto. For example, the type of charges stored in the first capacitor C1 and the second capacitor C2 may be changed based on the lifespan of the first capacitor C1. Also, although FIG. 8 shows an example in which the type of charges is changed when the number of uses of the second capacitor C2 reaches or exceeds half of the lifespan AB of the second capacitor C2, the inventive concept is not limited thereto. For example, the type of charges may be actively changed at various time points based on the number of uses of at least one of the first capacitor C1 and the second capacitor C2. For example, when the number of uses of the second capacitor C2 is equal to or greater than a pre-set value, the type of charges may be changed.

In the first frame, the reset charges re may be stored in the first capacitor C1 and the signal charges sc may be stored in the second capacitor C2. In each frame from the first frame to a j-th frame (FRAMEj), the reset charges rc may be stored in the first capacitor C1 and the signal charges sc may be stored in the second capacitor C2. After the first sampling control signal SAMPS1 transitions from a low level to a high level, the second sampling control signal SAMPS2 may transition from a low level to a high level. In each frame from the first frame to the j-th frame, after the first sampling transistor SAMP1 is turned on and the reset charges re are stored in the first capacitor C1, the second sampling transistor SAMP2 may be turned on and the signal charges sc may be stored in the second capacitor C2. The j-th frame may be a frame in which the number of uses of the second capacitor C2 corresponds to half (AB/2) of the lifespan AB of the second capacitor C2.

In a j+1-th frame (FRAMEj+1), the types of charges stored in the first capacitor C1 and the second capacitor C2 may be changed. The order in which the first sampling transistor SAMP1 and the second sampling transistor SAMP2 are turned on may be changed based on the number of uses of the second capacitor C2. In each frame from the j+1-th frame to the N-th frame (FRAMEN), the reset charges rc may be stored in the second capacitor C2 and the signal charges sc may be stored in the first capacitor C1. After the second sampling control signal SAMPS2 transitions from a low level to a high level, the first sampling control signal SAMPS1 may transition from a low level to a high level. In each frame from the j+1-th frame to the N-th frame, after the second sampling transistor SAMP2 is turned on and the reset charges re are stored in the second capacitor C2, the first sampling transistor SAMP1 may be turned on and the signal charges sc may be stored in the first capacitor C1.

Figure 9:
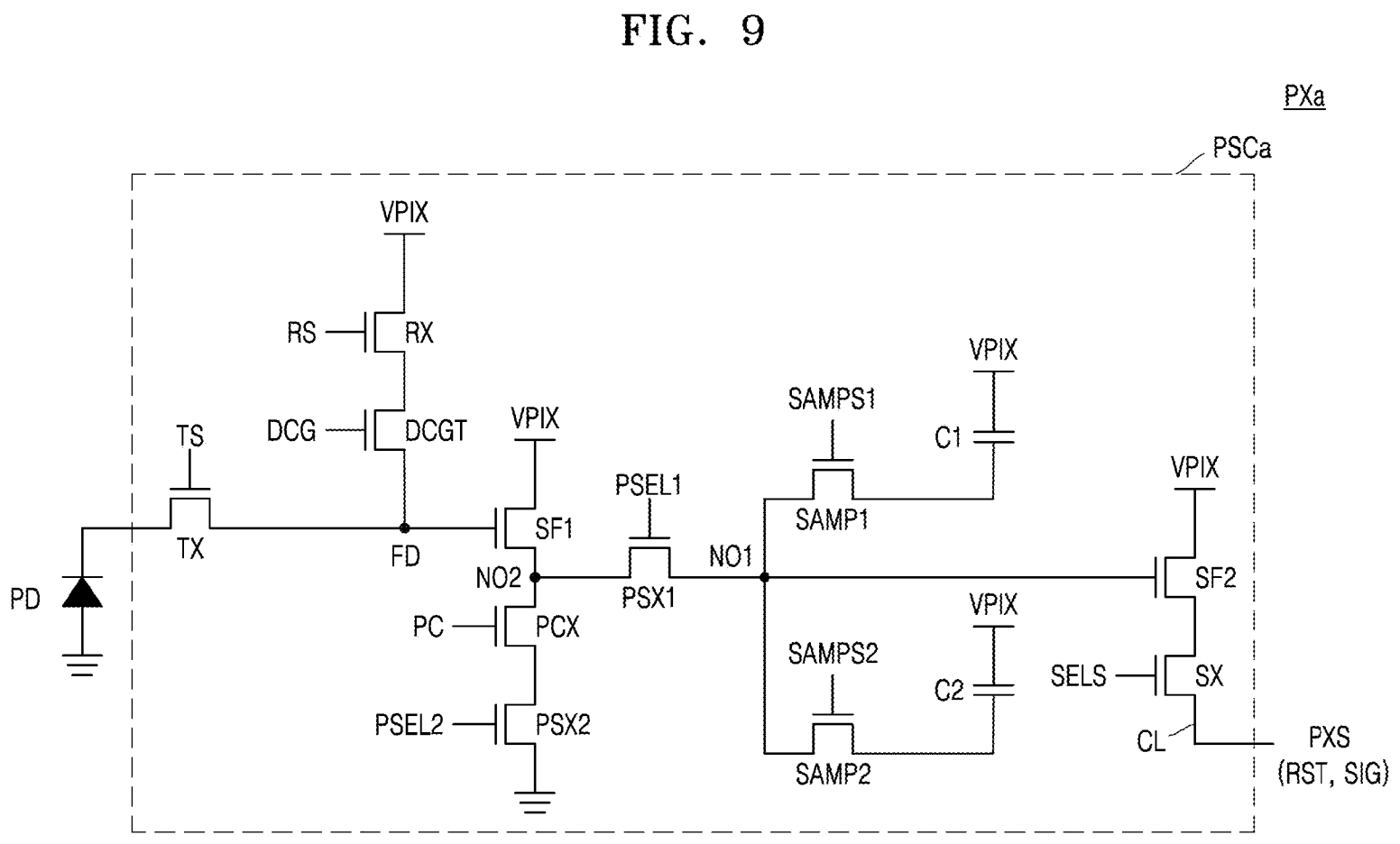

FIG. 9 is a circuit diagram of a pixel included in an image sensor, according to an embodiment. In the description of FIG. 9, descriptions of the same reference numerals as those in FIG. 3 will be omitted. Compared to FIG. 3, a pixel PXa of FIG. 9 includes a conversion gain transistor DCGT.

Referring to FIG. 9, the pixel PXa may include the photo diode PD and a pixel signal generation circuit PSCa that generates the pixel signal PXS. Control signals TS, RS, DCG, PSEL1, PSEL2, PC, SAMPS1, SAMPS2, and SELS applied to the pixel signal generation circuit PSCa may be some of the control signals (e.g., the control signals Ctrl of FIG. 1) generated by the row driver (e.g., the row driver 400 of FIG. 1).

The pixel signal generation circuit PSCa may include the reset transistor RX and the conversion gain transistor DCGT. The pixel voltage VPIX may be applied to the first terminal of the reset transistor RX, and the second terminal of the reset transistor RX may be connected to the conversion gain transistor DCGT. A first terminal of the conversion gain transistor DCGT may be connected to the reset transistor RX, and a second terminal of the conversion gain transistor DCGT may be connected to the floating diffusion node FD.

The reset transistor RX may be turned on or turned off by the reset control signal RS received from the row driver, and the conversion gain transistor DCGT may be turned on or turned off in response to a conversion gain control signal DCG received from the row driver. For example, a gate terminal of the conversion gain transistor DCGT may receive the conversion gain control signal DCG. When the reset transistor RX and the conversion gain transistor DCGT are turned on, charges accumulated in the floating diffusion node FD may be discharged, and thus the floating diffusion node FD may be reset.

Figure 10:
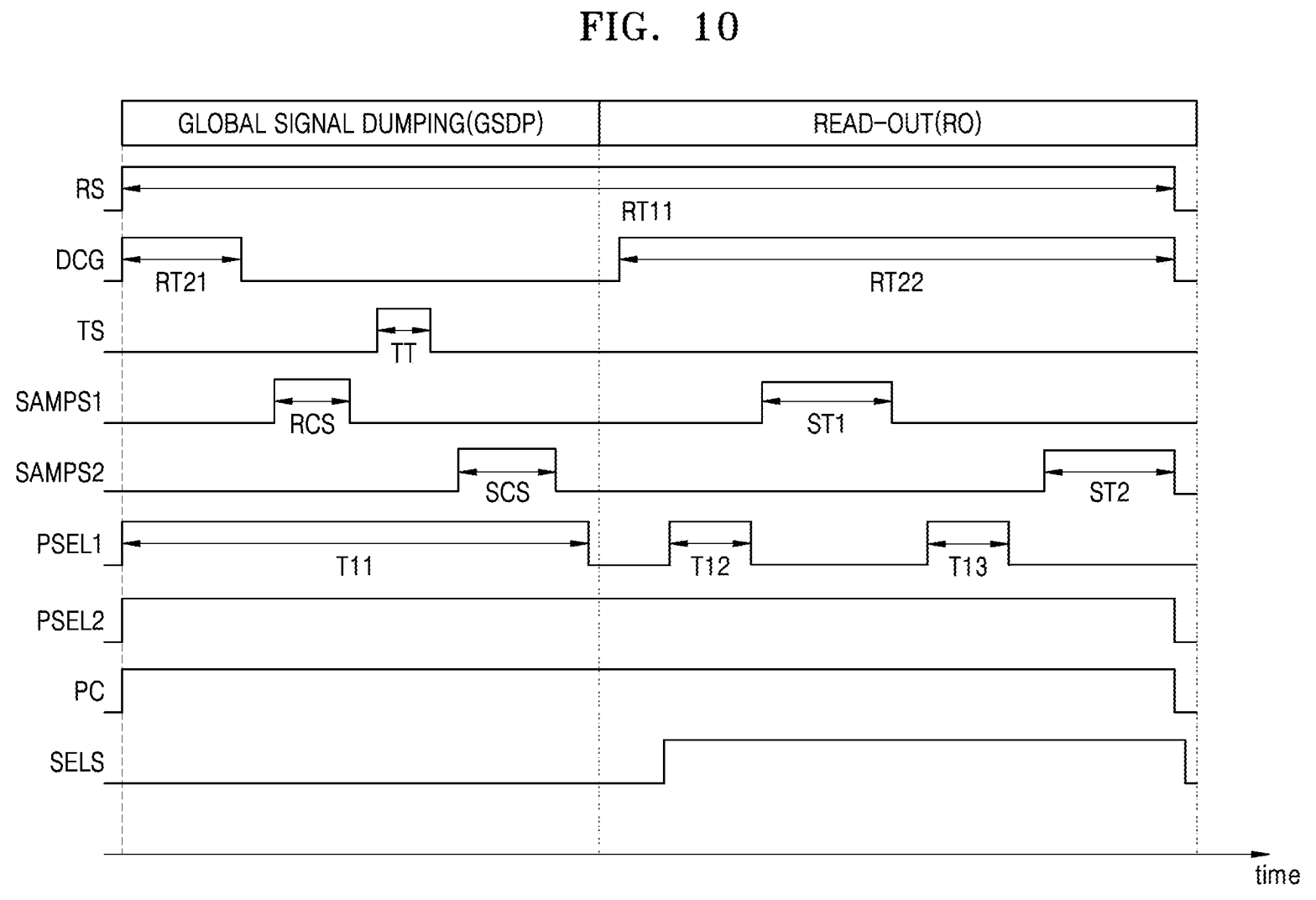

FIG. 10 is a timing diagram showing control signals provided to pixels of an image sensor, according to an embodiment. Control signals described with reference to FIG. 10 may be provided to the pixel PXa described above with reference to FIG. 9 and will be described below with reference to FIG. 9 for convenience of explanation. In the description of FIG. 10, descriptions identical to those given above with reference to FIG. 4 will be omitted.

Referring to FIGS. 10 and 9, in the global signal dumping period GSDP, the reset control signal RS may transition from a second level (e.g., low level) to a first level (e.g., high level) and maintain the high level during a first reset time RT11. In the global signal dumping period GSDP, the conversion gain control signal DCG may transition from a second level to a first level and maintain the first level for a first reset time RT21. When the reset transistor RX and the conversion gain transistor DCGT are turned on by the reset control signal RS having the high-level and the conversion gain control signal DCG having the high-level, the floating diffusion node FD may be reset (reset operation).

According to an embodiment, the image sensor supports a dual conversion gain (DCG) function by operating in a low conversion gain (LCG) mode and a high conversion gain (HCG) mode. In the HCG mode, when the transfer control signal TS maintains a high level for the integration time TT, the conversion gain control signal DCG may be at a low level.

Since the conversion gain transistor DCGT is turned off while photo charges are being accumulated in the floating diffusion node FD, the effect of substantially reducing the equivalent capacitance of the floating diffusion node FD may occur, and the conversion gain for converting photo charges generated by the photo diode PD into the image signal SIG may be relatively increased. Although FIG. 10 is a timing diagram where the image sensor operates in the HCG mode, the image sensor according to the inventive concept is not limited thereto. When the image sensor operates in the LCG mode, the conversion gain control signal DCG may maintain a high level during the integration time TT during which the transfer control signal TS maintains a high level. In the LCG mode, the conversion gain for converting the photo charges generated by the photo diode PD into the image signal SIG may be relatively reduced, and a relatively large amount of photo charges may be accumulated in the floating diffusion node FD.

When the reset control signal RS maintains a high level in a read-out period (RO), the conversion gain control signal DCG may maintain a high level during a second reset time RT22. When the reset transistor RX is turned on by the reset control signal RS having the high-level and the conversion gain transistor DCGT is turned on by the conversion gain control signal DCG having the high-level, the floating diffusion node FD may be reset.

When an output node reset operation ends, the first sampling control signal SAMPS1 may transition from a low level to a high level and maintain the high level for a first settling time ST1. At this time, in the first settling time ST1 during which the first sampling control signal SAMPS1 maintains the high level, the selection control signal SELS may be at a high level, the selection transistor SX may be turned on, and the reset signal RST corresponding to charges sampled from the first capacitor C1 according to a reset operation may be output through the column line CL.

After the first settling time ST1 has elapsed and the first sampling control signal SAMPS1 transitions from a high level to a low level, the first pre-charge selection control signal PSEL1 may transition from a low level to a high level and the first pre-charge selection control signal PSEL1 may maintain the high level for a third time period T13. After the first pre-charge selection control signal PSEL1 transitions from a high level to a low level, the second sampling control signal SAMPS may transition from a low level to a high level and maintain the high level for the second settling time ST2.

Figure 11:
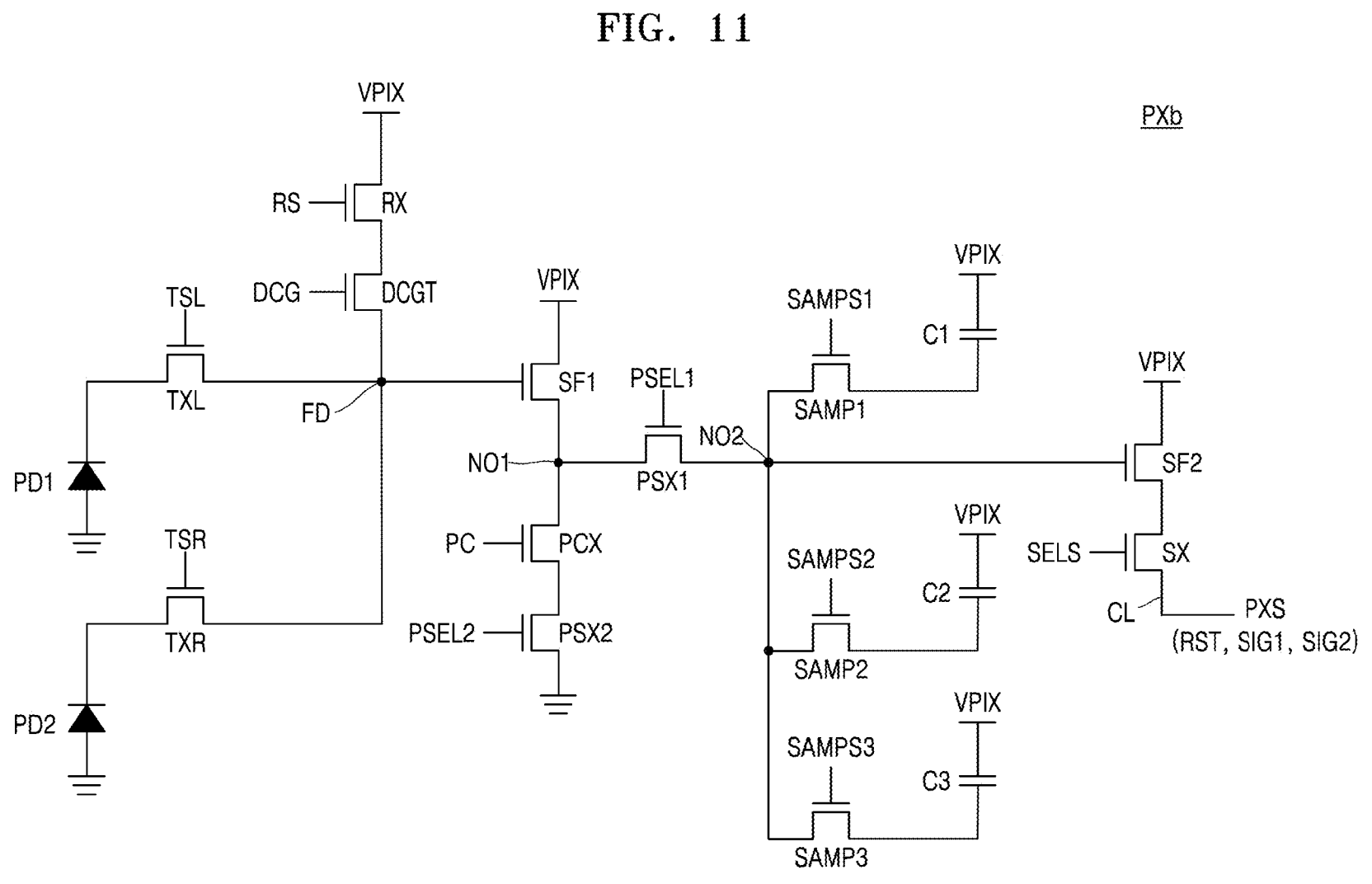

FIG. 11 is a circuit diagram of a pixel included in an image sensor, according to an embodiment. In the description of FIG. 11, descriptions of the same reference numerals as those in FIGS. 3 and 9 will be omitted.

Referring to FIG. 11, a pixel PXb may include at least two photo diodes configured to be exposed to a light source. The pixel PXb may include a first photo diode PD1 and a second photo diode PD2. According to an embodiment, to generate a high dynamic range (HDR) image, the sensitivity of the first photo diode PD1 and the sensitivity of the second photo diode PD2 are different from each other. For example, the sensitivity of each photo diode may be determined by the size of the photo diode. For example, the pixel PXb may include the first photo diode PD1, which is a large photo diode with a relatively large light-receiving area, and the second photo diode PD2, which is a small photo diode with a relatively small light-receiving area. For example, the light-receiving area of the first photo diode PD1 may be larger than the light-receiving area of the second photo diode PD2. As such, a structure in which one pixel PXb includes the first photo diode PD1 and the second photo diode PD2 may be referred to as a split photo diode structure. However, the inventive concept is not limited thereto, and the above-stated structure may be referred to by another name.

Since the light-receiving area of the first photo diode PD1 is large, more charges may be generated by the first photo diode PD1 than the second photo diode PD2 under the same light-receiving conditions. In other words, the first photo diode PD1 may have a sensitivity higher than that of the second photo diode PD2. The first photo diode PD1 may generate a pixel signal corresponding to low illuminance, and the second photo diode PD2 may generate a pixel signal corresponding to high illuminance. However, the inventive concept is not limited thereto, and the pixel PXb may include a plurality of photo diodes with the same or different light-receiving areas.

The pixel PXb may include a first transfer transistor TXL that transfers photo charges generated by the first photo diode PD1 to the floating diffusion node FD. The pixel PXb may include a second transfer transistor TXR that transfers photo charges generated by the second photo diode PD2 to the floating diffusion node FD. A transfer control signal TSL provided to the first transfer transistor TXL and a transfer control signal TSR provided to the second transfer transistor TXR may be some of the control signals Ctrl generated by the row driver 400 of FIG. 1.

According to an embodiment, the pixel PXb further includes a third capacitor C3 and a third sampling transistor SAMP3. The third capacitor C3 may store charges according to the voltage of the floating diffusion node FD. The third sampling transistor SAMP3 may sample charge from the third capacitor C3. The pixel voltage VPIX may be applied to a first terminal of the third capacitor C3, and the third sampling transistor SAMP3 may be connected to a second terminal of the third capacitor C3.

The first capacitor C1, the second capacitor C2, and the third capacitor C3 may each store different one of reset charges, first signal charges according to the voltage of the floating diffusion node FD in which photo charges generated by the first photo diode PD1 are accumulated, and second signal charges according to the voltage of the floating diffusion node FD in which photo charges generated by the second photodiode PD2 are accumulated in each frame. For example, the reset charges may be stored in the first capacitor C1, the second signal charges may be stored in the second capacitor C2, and the first signal charges may be stored in the third capacitor C3.

According to an embodiment, the types of charges stored in the first capacitor C1, the second capacitor C2, and the third capacitor C3 may be changed. The types of charges may include the reset charges, the first signal charges, and the second signal charges. In at least one of frames, the types of charges stored in the first capacitor C1, the second capacitor C2, and the third capacitor C3 may be changed. For example, in the first frame, the reset charges may be stored in the first capacitor C1, the second signal charges may be stored in the second capacitor C2, and the first signal charges may be stored in the third capacitor C3. In the second frame, the reset charges may be stored in the third capacitor C3, the first signal charges may be stored in the first capacitor C1, and the second signal charges may be stored in the second capacitor C2. However, charges stored in respective capacitors are not limited thereto.

According to an embodiment, the order in which at least one of the first sampling transistor SAMP1, the second sampling transistor SAMP2, and the third sampling transistor SAMP3 is turned on may be changed. By changing the order in which the first sampling transistor SAMP1, the second sampling transistor SAMP2, and the third sampling transistor SAMP3 are turned on, the types of charges stored in the first capacitor C1, the second capacitor C2, and the third capacitor C3 may be changed. Although FIG. 11 shows three capacitors, the inventive concept is not limited thereto. For example, the pixel PXb may include more than three capacitors.

In a read-out period, when the selection transistor SX is turned on and the first sampling transistor SAMP1 is turned on, a signal corresponding to charges stored in the first capacitor C1 may be output to the column line CL. When the selection transistor SX is turned on and the second sampling transistor SAMP2 is turned on, a signal corresponding to charges stored in the second capacitor C2 may be output to the column line CL. When the selection transistor SX is turned on and the third sampling transistor SAMP3 is turned on, a signal corresponding to charges stored in the third capacitor C3 may be output to the column line CL.

Figure 12:
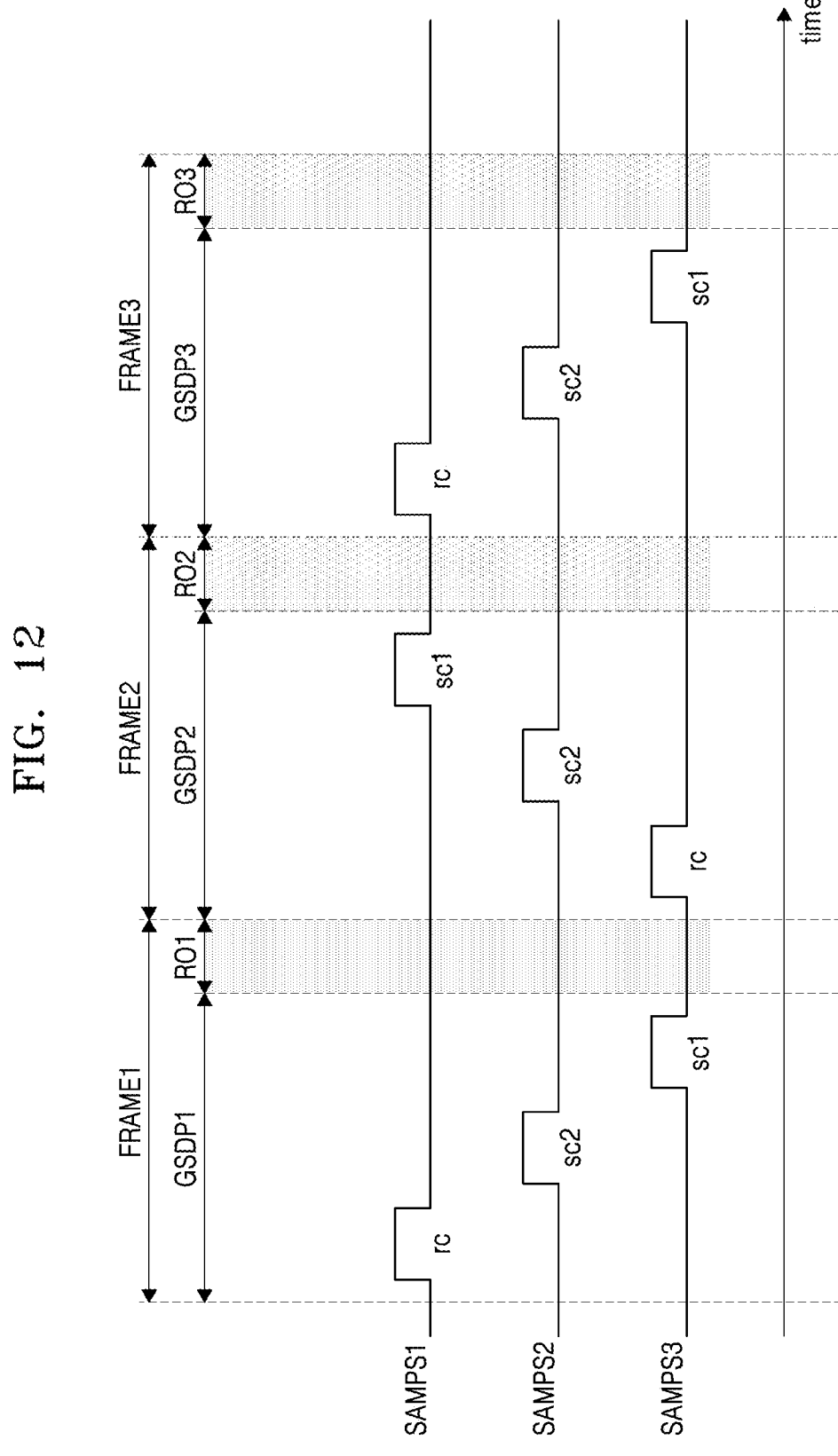
FIG. 12 is a diagram illustrating change of charge types, according to an embodiment.

FIG. 12 is a diagram illustrating charge types being changed, according to an embodiment. Hereinafter, descriptions are given with reference to FIG. 11. Also, descriptions identical to those already given above with reference to FIG. 5 will be omitted.

Referring to FIGS. 11 and 12, the types of charges stored in the first capacitor C1, the second capacitor C2, and the third capacitor C3 may be changed. Although FIGS. 11 and 12 show the pixel PXb including three capacitors, the inventive concept is not limited thereto, and, even when the pixel PXb includes four or more capacitors, the types of charges stored in the four or more capacitors may be changed. Also, although FIG. 12 shows a case where the types of charges stored in the first capacitor C1, the second capacitor C2, and the third capacitor C3 are changed for each frame, the inventive concept is not limited thereto, and, as shown in FIGS. 6 to 8, the types of charges stored in the first capacitor C1, the second capacitor C2, and the third capacitor C3 may be changed in various ways.

According to an embodiment, the types of charges stored in the first capacitor C1, the second capacitor C2, and the third capacitor C3 may be changed in each frame. By changing the order in which the first sampling transistor SAMP1, the second sampling transistor SAMP2, and the third sampling transistor SAMP3 are turned on in each frame, the types of charges stored in the first capacitor C1, the second capacitor C2, and the third capacitor C3 may be changed in each frame.

In the first global signal dumping period GSDP1 of the first frame, the first sampling control signal SAMPS1 may transition from a low level to a high level. The first sampling transistor SAMP1 may be turned on by the first sampling control signal SAMPS1 having the high-level. When the first sampling transistor SAMP1 is turned on, reset charges re of the reset floating diffusion node FD may be stored in the first capacitor C1. The voltage difference between both ends of the first capacitor C1 may be relatively small.

After the first sampling control signal SAMPS1 transitions from a high level to a low level, the second sampling control signal SAMPS2 may transition from a low level to a high level. The second sampling transistor SAMP2 may be turned on by the second sampling control signal SAMPS2 having the high-level. When the second sampling transistor SAMP2 is turned on, second signal charges sc2 may be stored in the second capacitor C2. The voltage difference between both ends of the second capacitor C2 may be greater than the voltage difference between both ends of the first capacitor C1.

After the second sampling control signal SAMPS2 transitions from a high level to a low level, a third sampling control signal SAMPS3 may transition from a low level to a high level. The third sampling transistor SAMP3 may be turned on by the third sampling control signal SAMPS3 having the high-level. When the third sampling transistor SAMP3 is turned on, first signal charges sc1 may be stored in the third capacitor C3. The voltage difference between both ends of the third capacitor C3 may be greater than the voltage difference between both ends of the second capacitor C2. In the first frame, the voltage differences between both ends of each of the first capacitor C1, the second capacitor C2, and the third capacitor C3 may be different from one another.

In the second global signal dumping period GSDP2 of the second frame, the third sampling control signal SAMPS3 may first transition from a low level to a high level. The third sampling transistor SAMP3 may be turned on by the third sampling control signal SAMPS3 having the high-level, and the reset charges re may be stored in the third capacitor C3.

After the third sampling control signal SAMPS3 transitions from a high level to a low level, the second sampling control signal SAMPS2 may transition from a low level to a high level. The second sampling transistor SAMP2 may be turned on by the second sampling control signal SAMPS2 having the high-level, and second signal charges sc2 may be stored in the second capacitor C2.

After the second sampling control signal SAMPS2 transitions from a high level to a low level, the first sampling control signal SAMPS1 may transition from a low level to a high level. The first sampling transistor SAMP1 may be turned on by the first sampling control signal SAMPS1 having the high-level, and the first signal charges sc1 may be stored in the first capacitor C1. The types of charges stored in the first capacitor C1, the second capacitor C2, and the third capacitor C3 may be changed in each frame.

In the third frame, the first sampling control signal SAMPS1, the second sampling control signal SAMPS2, and the third sampling control signal SAMPS3 may operate in the same manner as in the first frame. Although FIG. 12 shows that the types of charges stored in the first capacitor C1 and the third capacitor C3 are changed, the inventive concept is not limited thereto, and the types of charges stored in at least two of capacitors may be changed.

Since the types of charge stored in at least two of the first capacitor C1, the second capacitor C2, and the third capacitor C3 are changed, the overall lifespans of the first capacitor C1, the second capacitor C2, and the third capacitor C3 may be increased as compared to the case where only the first signal charges se1 are stored in one of the first capacitor C1, the second capacitor C2, and the third capacitor C3. Therefore, the overall lifespan of the image sensor may be increased.

Figure 13:
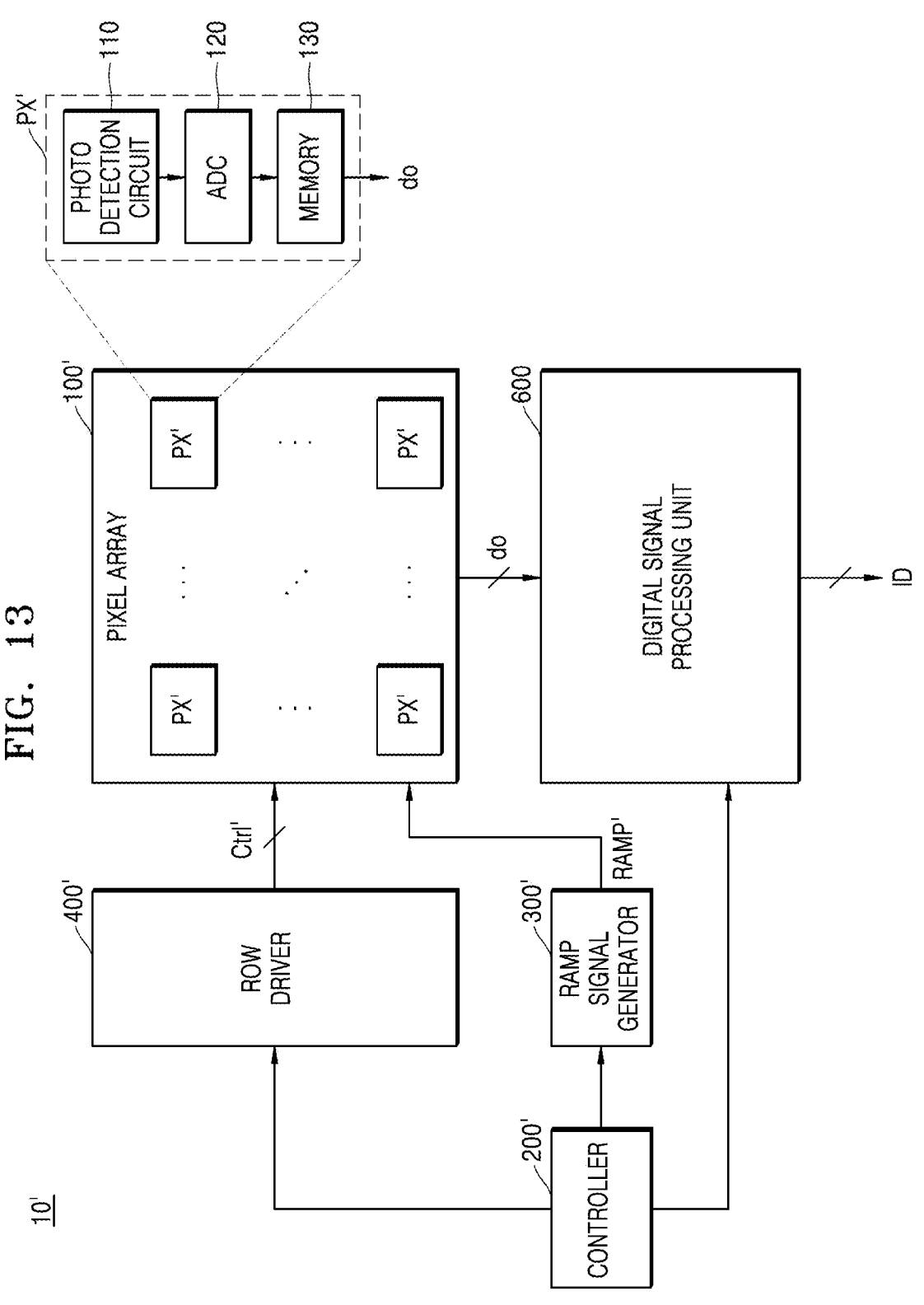
FIG. 13 is a block diagram showing an image sensor according to an embodiment.

FIG. 13 is a block diagram showing an image sensor according to an embodiment. Compared to the image sensor 10 of FIG. 1, an image sensor 10' of FIG. 13 may include an ADC 120 in each pixel PX'. In the description of FIG. 13, descriptions of the same reference numerals as those in FIG. 1 will be omitted. The pixel PX' described with reference to FIG. 13 may be a digital pixel.

The pixel PX may include a photo detection circuit 110, the ADC 120, and a memory 130. The photo detection circuit 110 may include a photoelectric conversion element and convert an externally detected optical signal into an electrical signal, i.e., an analog pixel signal. For example, the photoelectric conversion element may include a photo diode, a photo transistor, a port gate, or a PPD.

The photo detection circuit 110 may include a plurality of capacitors that store charges according to the voltage of a floating diffusion node. In one frame, the types of charges stored in a plurality of capacitors may not be identical to one another. For example, a first capacitor may store one of reset charges and signal charges, and a second capacitor may store the other one of the reset charges and the signal charges not stored in the first capacitor.

According to an embodiment, the types of charges stored in the plurality of capacitors included in the photo detection circuit 110 may be changed. For example, the type of charges stored in the first capacitor and the type of charges stored in the second capacitor are not always the same.

The ADC 120 may convert a pixel signal output from the photo detection circuit 110 into a digital signal, and the memory 130 may store the converted digital signal. The memory 130 may output a pixel value do under the control of the row driver 400. The ADC 120 may convert a pixel signal into the pixel value do, which is a digital signal, by comparing the pixel signal with a ramp signal RAMP'. The ADC 120 may perform the same or similar operations as the ADC 520 of FIG. 1.

A controller 200' may control the overall operation of the image sensor 10'.

A row driver 400' may generate control signals Ctrl' for controlling a pixel array 100' and provide the control signals Ctrl' to the plurality of pixels PX'.

A ramp signal generator 300' may generate the ramp signal RAMP'. The ramp signal RAMP' is a signal for converting an analog signal into a digital signal and may be generated in the form of a triangle wave. The ramp signal generator 300' may transmit the ramp signal RAMP' to the pixel array 100'.

A digital signal processor 600 (or a digital signal processing unit) may perform digital signal processing on pixel values do received from the pixel array 100' to provide final image data ID to an external device. The digital signal processor 600 may determine a final digital value corresponding to an optical signal detected at one pixel PX' by performing a calculation on the pixel value do. The final image data ID may be generated by combining final digital values respectively determined for the plurality of pixels PX'.

Figure 14:
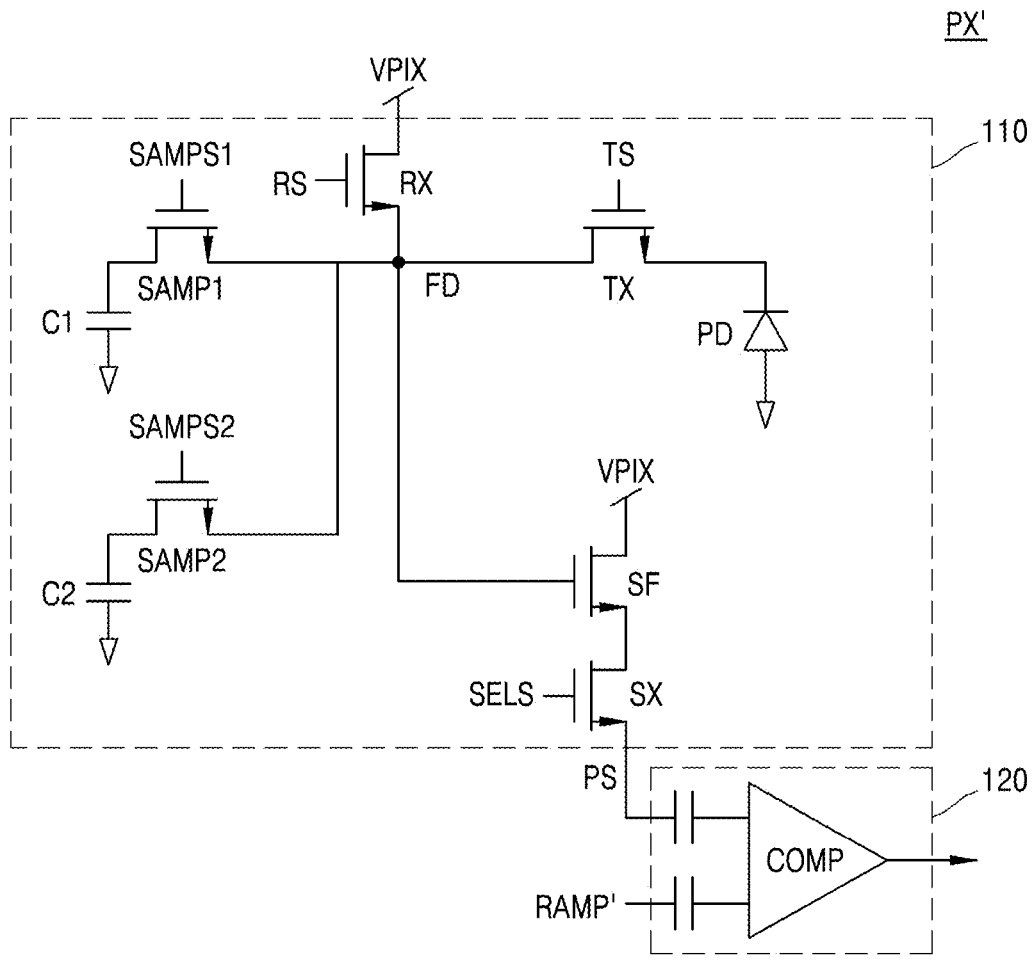
FIG. 14 is a circuit diagram showing the configuration of a pixel according to an embodiment.

FIG. 14 is a circuit diagram showing the configuration of a pixel according to an embodiment. The pixel PX' of FIG. 14 may be the pixel PX' included in the image sensor 10' of FIG. 13. In the description of FIG. 14, descriptions identical to those given above with reference to FIG. 3 will be omitted.

Referring to FIG. 14, the pixel PX' may include the photo detection circuit 110 and the ADC 120. The photo detection circuit 110 may include a plurality of transistors TX, RX, SAMP1, SAMP2, SF, and SX, the first capacitor C1, and the second capacitor C2.

A first terminal of the first sampling transistor SAMP1 may be connected to the floating diffusion node FD, and a second terminal of the first sampling transistor SAMP1 may be connected to the first capacitor C1. The first sampling transistor SAMP1 may sample charges to the first capacitor C1.

A voltage (e.g., the pixel voltage VPIX or a ground voltage) may be applied to a first terminal of the first capacitor C1, and a second terminal of the first capacitor C1 may be connected to the first sampling transistor SAMP1.

A first terminal of the second sampling transistor SAMP2 may be connected to the floating diffusion node FD, and a second terminal of the second sampling transistor SAMP2 may be connected to the second capacitor C2. The second sampling transistor SAMP2 may sample charges to the second capacitor C2.

A voltage (e.g., the pixel voltage VPIX or a ground voltage) may be applied to the first terminal of the second capacitor C2, and the second terminal of the second capacitor C2 may be connected to the second sampling transistor SAMP2. For example, in the first frame, reset charges may be stored in the first capacitor C1 and signal charges may be stored in the second capacitor C2.

According to an embodiment, the types of charges stored in the first capacitor C1 and the second capacitor C2 may be changed. The types of charges may include reset charges and signal charges. Not only reset charges are stored in the first capacitor C1 and not only signal charges are stored in the second capacitor C2 in every frame. Rather, the types of charges stored in the first capacitor C1 and the second capacitor C2 may be changed in at least one of several frames. For example, in the first frame, reset charges may be stored in the first capacitor C1 and signal charges may be stored in the second capacitor C2. In a second frame, reset charges may be stored in the second capacitor C2 and signal charges may be stored in the first capacitor C1.

According to an embodiment, the order in which the first sampling transistor SAMP1 and the second sampling transistor SAMP2 are turned on may be changed. By changing the order in which the first sampling transistor SAMP1 and the second sampling transistor SAMP2 are turned on, the type of charges stored in the first capacitor C1 and the second capacitor C2 may be changed.

The photo detection circuit 110 may include a source follower SF and the selection transistor SX. The pixel voltage VPIX may be applied to a first terminal of the source follower SF, and a second terminal of the source follower SF may be connected to the selection transistor SX. The source follower SF may amplify and output a change of the potential at the floating diffusion node FD. The source follower SF may generate a pixel signal PS corresponding to the voltage of the floating diffusion node FD.

A first terminal of the selection transistor SX may be connected to the source follower SF, and a second terminal of the selection transistor SX may be connected to the ADC 120. The selection transistor SX may be turned on or off in response to a selection control signal SELS received from the row driver. When the selection transistor SX is turned on, the pixel signal PS may be transmitted to the ADC 120. When the selection transistor SX is turned on in a read-out operation, the pixel signal PS including a reset signal corresponding to a reset operation or an image signal corresponding to a charge accumulation operation may be output to the ADC 120. Although two storage capacitors (e.g., C1 and C2) are shown in FIG. 14, according to some embodiments, the pixel PX' may include three or more storage capacitors.

Figure 15:
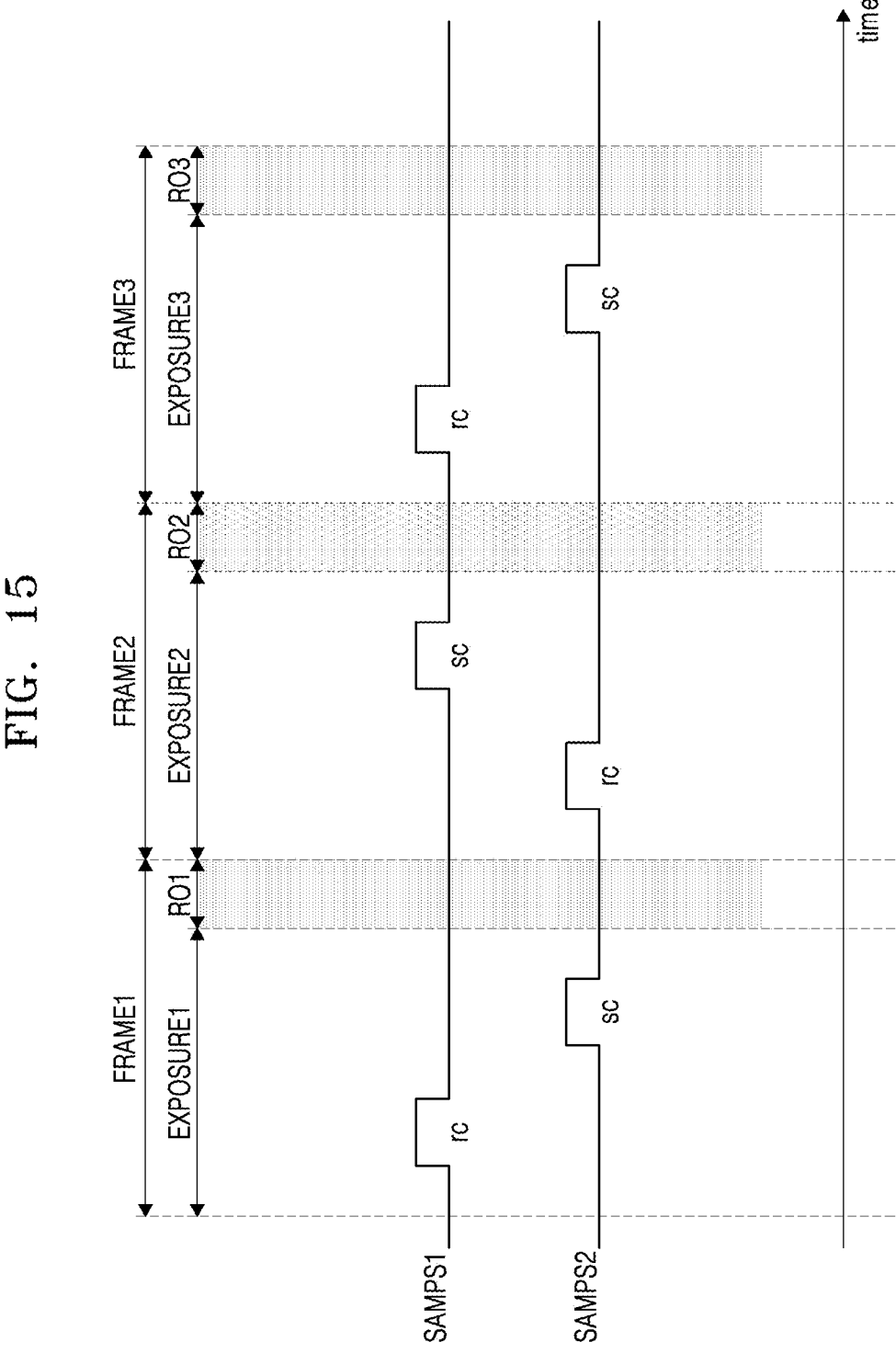
FIG. 15 is a diagram illustrating change of charge types, according to an embodiment.

FIG. 15 is a diagram illustrating charge types being changed, according to an embodiment. Hereinafter, descriptions are given with reference to FIG. 14. Also, descriptions identical to those already given above with reference to FIG. 5 will be omitted.

Referring to FIGS. 14 and 15, the types of charges stored in the first capacitor C1 and the second capacitor C2 may be changed. According to an embodiment, the types of charges stored in the first capacitor C1 and the second capacitor C2 may be changed for each frame. The types of charges stored in the first capacitor C1 and the second capacitor C2 may be different in the first frame and the second frame consecutive to the first frame. The order in which the first sampling transistor SAMP1 and the second sampling transistor SAMP2 are turned on may be changed for each frame, and the types of charges stored in the first capacitor C1 and the second capacitor C2 may be changed for each frame.

FIG. 15 shows a first frame, a second frame, and a third frame for convenience of explanation and shows the first sampling control signal SAMPS1 and the second sampling control signal SAMPS2 from among control signals. Although FIGS. 14 and 15 show the pixel PX' including three storage capacitors, the inventive concept is not limited thereto, and, even when the pixel PX' includes three or more storage capacitors, the types of charges stored in the three or more storage capacitors may be changed. Also, although FIG. 15 shows a case where the types of charges stored in the first capacitor C1 and the second capacitor C2 are changed for each frame, the inventive concept is not limited thereto, and, as shown in FIGS. 6 to 8, the types of charges stored in the first capacitor C1 and the second capacitor C2 may be changed in various ways.

Compared to FIG. 5, the first frame may include a first exposure period EXPOSURE1 and the first read-out period RO1. The second frame may include a second exposure period EXPOSURE2 and the second read-out period RO2. The third frame may include a third exposure period EXPOSURE3 and the third read-out period RO3.

In the first exposure period EXPOSURE1 of the first frame, the first sampling transistor SAMP1 and the second sampling transistor SAMP2 may operate in a manner the same as or similar to that of the first global signal dumping period GSDP1 of FIG. 3. When the first sampling transistor SAMP1 is turned on, reset charges re of the reset floating diffusion node FD may be stored in the first capacitor C1. Thereafter, when the second sampling transistor SAMP2 is turned on, signal charges sc of the floating diffusion node FD in which photo charges are accumulated may be stored in the second capacitor C2.

In the second exposure period EXPOSURE2 of the second frame, the first sampling transistor SAMP1 and the second sampling transistor SAMP2 may operate in a manner the same as or similar to that of the second global signal dumping period GSDP2 of FIG. 3. When the second sampling transistor SAMP2 is turned on, the reset charges re of the reset floating diffusion node FD may be stored in the second capacitor C2. Thereafter, when the first sampling transistor SAMP1 is turned on, signal charges sc of the floating diffusion node FD in which photo charges are accumulated may be stored in the first capacitor C1.

In the third exposure period EXPOSURE3 of the third frame, the first sampling transistor SAMP1 and the second sampling transistor SAMP2 may operate in a manner the same as or similar to that in the first exposure period EXPOSURE1.

Figure 16:
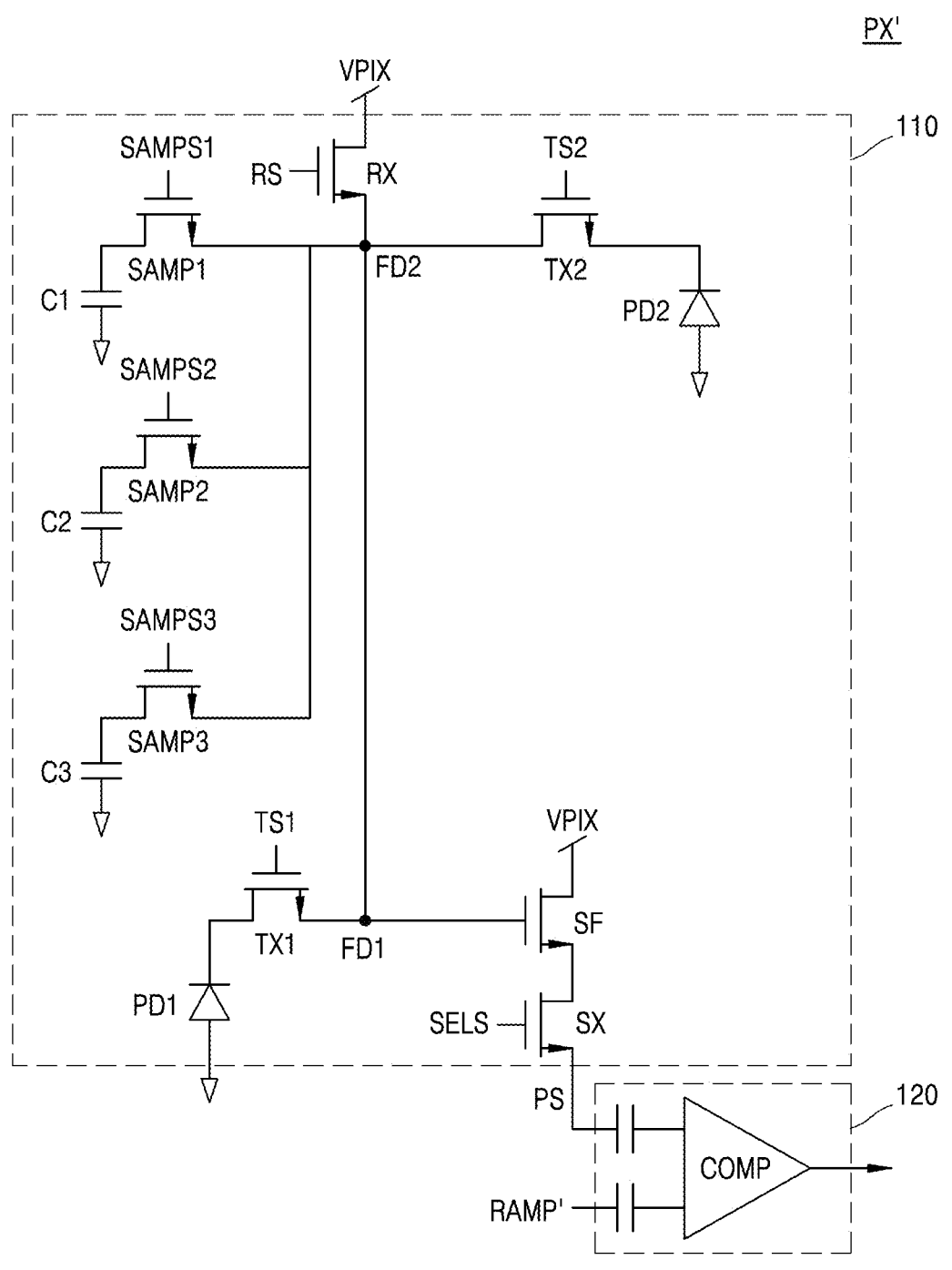
FIG. 16 is a circuit diagram of a pixel included in an image sensor, according to an embodiment.

FIG. 16 is a circuit diagram of a pixel included in an image sensor, according to an embodiment. Descriptions identical to those already given above will be omitted.

Referring to FIG. 16, the pixel PX' may include at least two photo diodes configured to be exposed to a light source. The pixel PX' may include the first photo diode PD1 and the second photo diode PD2. According to an embodiment, to generate a HDR image, the sensitivity of the first photo diode PD1 and the sensitivity of the second photo diode PD2 may be different from each other. For example, the sensitivity of each photo diode may be determined by the size of the photo diode.

The pixel PX' may include a first transfer transistor TX1 that transfers photo charges generated by the first photo diode PD1 to the floating diffusion node FD. The pixel PX' may include a second transfer transistor TX2 that transfers photo charges generated by the second photo diode PD2 to the floating diffusion node FD. A transfer control signal TS1 provided to the first transfer transistor TX1 and a transfer control signal TS2 provided to the second transfer transistor TX2 may be some of the control signals Ctrl' generated by the row driver 400' of FIG. 13.

According to an embodiment, the pixel PX' may further include a third capacitor C3 and a third sampling transistor SAMP3. The third capacitor C3 may store charges according to the voltage of the floating diffusion node FD. The third sampling transistor SAMP3 may sample charge from the third capacitor C3. The pixel voltage VPIX may be applied to a first terminal of the third capacitor C3, and the third sampling transistor SAMP3 may be connected to a second terminal of the third capacitor C3. A first terminal of the third sampling transistor SAMP3 may be connected to a second floating diffusion node FD2, and a second terminal of the third sampling transistor SAMP3 may be connected to the third capacitor C3.

The first capacitor C1, the second capacitor C2, and the third capacitor C3 may each store a different one of reset charges, first signal charges according to the voltage of the first floating diffusion node FD1 in which photo charges generated by the first photo diode PD1 are accumulated, and second signal charges according to the voltage of the second floating diffusion node FD2 in which photo charges generated by the second photodiode PD2 are accumulated in each frame.

According to an embodiment, the types of charges stored in the first capacitor C1, the second capacitor C2, and the third capacitor C3 may be changed. The types of charges may include the reset charges, the first signal charges, and the second signal charges. In at least one of frames, the types of charges stored in the first capacitor C1, the second capacitor C2, and the third capacitor C3 may be changed. For example, in the first frame, the reset charges may be stored in the first capacitor C1, the second signal charges may be stored in the second capacitor C2, and the first signal charges may be stored in the third capacitor C3. In the second frame, the reset charges may be stored in the third capacitor C3, the first signal charges may be stored in the first capacitor C1, and the second signal charges may be stored in the second capacitor C2. However, charges stored in respective capacitors are not limited thereto.

According to an embodiment, the order in which at least one of the first sampling transistor SAMP1, the second sampling transistor SAMP2, and the third sampling transistor SAMP3 is turned on may be changed. By changing the order in which the first sampling transistor SAMP1, the second sampling transistor SAMP2, and the third sampling transistor SAMP3 are turned on, the types of charges stored in the first capacitor C1, the second capacitor C2, and the third capacitor C3 may be changed. Although FIG. 16 shows three storage capacitors, the inventive concept is not limited thereto, and the pixel PXb may include more than three storage capacitors.

For example, the types of charges stored in the first capacitor C1, the second capacitor C2, and the third capacitor C3 may be changed in each frame. For example, the types of charges stored in the first capacitor C1, the second capacitor C2, and the third capacitor C3 may be changed in each frame, as shown in FIG. 12. However, the inventive concept is not limited thereto, and the types of charges stored in capacitors may be changed in various ways, as shown in FIGS. 6 to 8.

Figure 17:
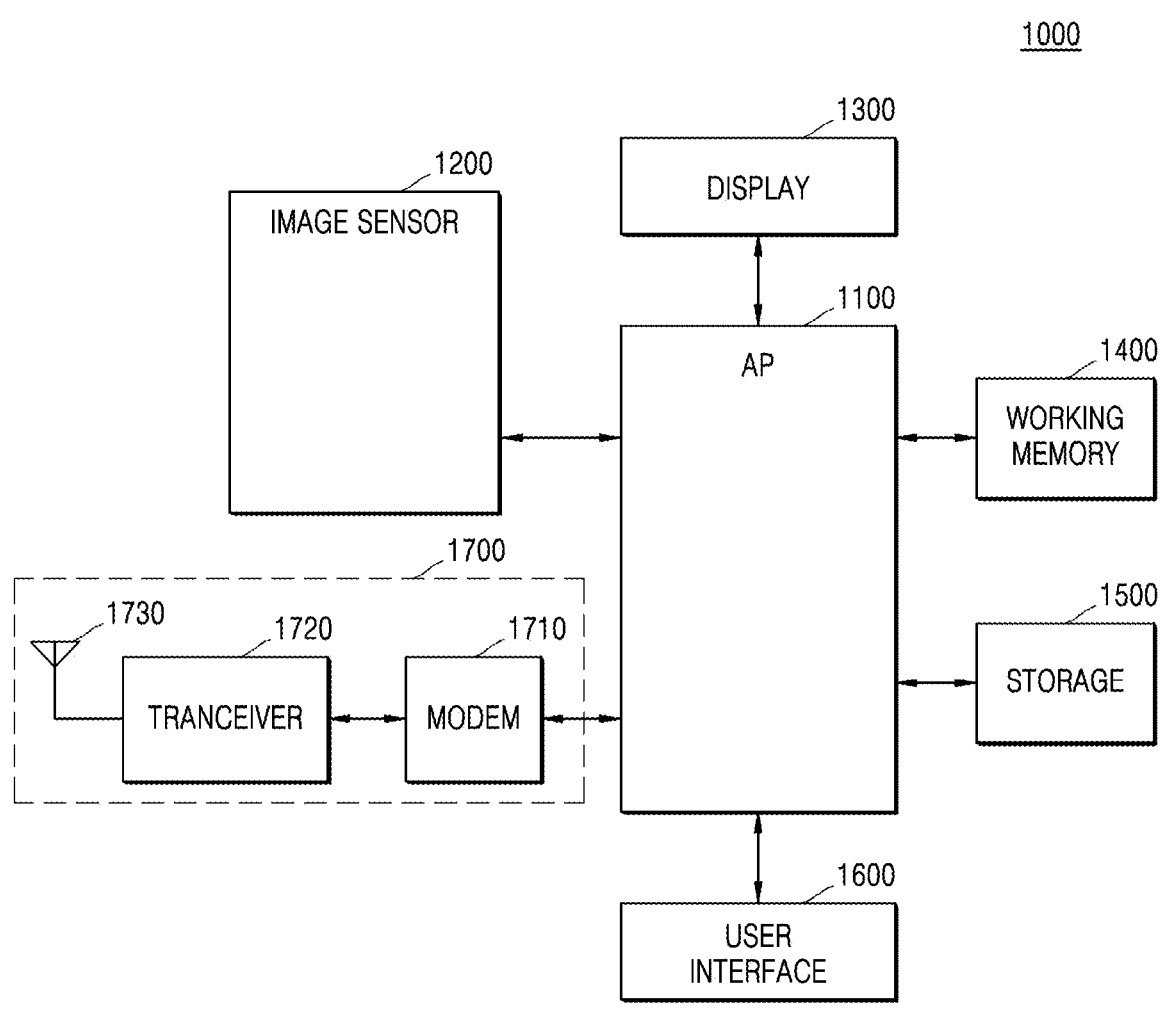
FIG. 17 is a block diagram of an electronic device according to an embodiment.

FIG. 17 is a block diagram of an electronic device according to an embodiment. For example, an electronic device 1000 may be a portable terminal.

Referring to FIG. 17, the electronic device 1000 according to an embodiment may include an application processor 1100, an image sensor 1200, a display device 1300, a working memory 1400, a storage 1500, a user interface 1600, and a wireless communication device 1700. Descriptions of an image sensor and a method of operating the image sensor according to embodiments given above with reference to FIGS. 1 to 16 may be applied to the image sensor 1200.

The application processor 1100 controls the overall operation of the electronic device 1000 and may be implemented as a system-on-chip (SoC) that drives an application program, an operating system, etc.

The application processor 1100 may receive output data from the image sensor 1200.

The image sensor 1200 may generate image data, such as image data, based on a received optical signal and provide the image data to the application processor 1100. The image sensor 1200 may include a plurality of pixels, each of which includes a plurality of storage capacitors. The type of charges stored in the plurality of storage capacitors according to the voltage of a floating node may be changed.

For example, the type of charges stored in the plurality of storage capacitors may be changed for each frame. For example, the type of charges stored in the plurality of storage capacitors may be changed each time the image sensor 1200 performs an image capturing operation. However, the inventive concept is not limited thereto, and the types of charges stored in a plurality of storage capacitors may be changed every N (N is a positive number of 2 or greater) frames or may be changed based on the numbers of uses of the storage capacitors.

The working memory 1400 may be implemented by a volatile memory such as a dynamic random access memory (DRAM) or a static RAM (SRAM) or a non-volatile resistive memory such as a ferroelectric RAM (FeRAM), a resistive RAM (RRAM), or a phase-change RAM (PRAM). The working memory 1400 may store programs and/or data processed or executed by the application processor 1100.

The storage 1500 (e.g., a storage device) may be implemented as a non-volatile memory device such as NAND flash or resistive memory. For example, the storage 1500 may be provided as a memory card (MMC, eMMC, SD, micro SD), etc. The storage 1500 may store data and/or programs regarding an execution algorithm that controls an image processing operation of the image sensor 1200, and, when an image processing operation is performed, the data and/or the programs may be loaded to the working memory 1400. According to an embodiment, the storage 1500 may store output image data generated by the image sensor 1200, e.g., corrected image data or post-processed image data.

The user interface 1600 may be implemented with various devices capable of receiving user inputs, e.g., a keyboard, a curtain key panel, a touch panel, a fingerprint sensor, a microphone, etc. The user interface 1600 may receive a user input and provide a signal corresponding to the received user input to the application processor 1100.

The wireless communication device 1700 may include a modem 1710, a transceiver 1720, and an antenna 1730.

While the inventive concept has been particularly shown and described with reference to embodiments thereof, it will be understood that various changes in form and details may be made therein without departing from the spirit and scope of the following claims.

What is claimed is:

1. An image sensor comprising a plurality of pixels, wherein a pixel among the plurality of pixels comprises:
   a first photo diode;
   a floating diffusion node configured to accumulate photo charges generated by the first photo diode;
   a first capacitor;
   a second capacitor;
   a first sampling transistor configured to sample charges from the first capacitor; and
   a second sampling transistor configured to sample charges from the second capacitor,
   wherein the image sensor operates the first capacitor to store one of reset charges according to a voltage of the floating diffusion node reset and signal charges according to a voltage of the floating diffusion node in which the photo charges are accumulated, operates the second capacitor to stores the other one of the reset charges and the signal charges and changes types of charges stored in each of the first capacitor and the second capacitor, and
   wherein the types of charges comprise the reset charges and the signal charges.

2. The image sensor of claim 1, wherein the image sensor changes the types of charges stored in the first capacitor and the second capacitor in each frame.

3. The image sensor of claim 1, wherein, in a first frame, after the reset charges are stored in the first capacitor, the signal charges are stored in the second capacitor, and, in a second frame consecutive to the first frame, the reset charges are stored in the second capacitor, and then the signal charges are stored in the first capacitor.

4. The image sensor of claim 1, wherein the types of charges stored in each of the first capacitor and the second capacitor are changed in each frame at which the image sensor starts an image capturing operation.

5. The image sensor of claim 1, wherein the types of charges stored in each of the first capacitor and the second capacitor are changed every N frames, where N is a positive integer greater than or equal to 2.

6. The image sensor of claim 5, wherein, in a first frame interval comprising N frames, in each frame, after the reset charges are stored in the first capacitor, the signal charges are stored in the second capacitor, and, in a second frame interval comprising the N frames after the first frame interval, in each frame, after the reset charges are stored in the second capacitor, the signal charges are stored in the first capacitor.

7. The image sensor of claim 1, wherein the image sensor further comprises a controller configured to calculate a number of uses of at least one of the first capacitor and the second capacitor, and the types of charges stored in each of the first capacitor and the second capacitor are changed based on the number of uses of at least one of the first capacitor and the second capacitor.

8. The image sensor of claim 1, wherein, in a given frame, when one of the reset charges and the signal charges is stored in the first capacitor, a voltage difference between both ends of the first capacitor is different from a voltage difference between both ends of the second capacitor when the other one of the reset charges and the signal charges is stored in the second capacitor in the given frame.

9. The image sensor of claim 1, wherein each of the pixels further comprises:

a reset transistor configured to reset the floating diffusion node to a pixel voltage; and a conversion gain transistor connected between the reset transistor and the floating diffusion node.

10. The image sensor of claim 1, wherein each of the pixels further comprises:

a second photo diode;

a third capacitor configured to store charges according to the voltage of the floating diffusion node; and a third sampling transistor configured to sample charges from the third capacitor, each of the first capacitor, the second capacitor, and the third capacitor stores a different one of the reset charges, first signal charges according to the voltage of the floating diffusion node in which photo charges generated by the first photo diode are accumulated, and second signal charges according to the voltage of the floating diffusion node in which photo charges generated by the second photodiode are accumulated in each frame, and the types of charges stored in at least two of the first capacitor, the second capacitor, and the third capacitor are changed.

11. An image sensor comprising a plurality of pixels, wherein a pixel among the plurality of pixels comprises:

a photo diode;

a floating diffusion node configured to accumulate photo charges generated by the photo diode;

a first sampling transistor; and a second sampling transistor, wherein the image sensor turns on the first sampling transistor to sample one of reset charges according to a voltage of the floating diffusion node reset and signal charges according to a voltage of the floating diffusion node in which the photo charges are accumulated in a first capacitor, turns on the second sampling transistor to sample the other one of the reset charges and the signal charges from a second capacitor, and changes an order in which the first sampling transistor and the second sampling transistor are turned on.

12. The image sensor of claim 11, wherein the image sensor changes the order in each of a plurality of frames.

13. The image sensor of claim 11, wherein, in a first frame, after the first sampling transistor is turned on and the reset charges are stored in the first capacitor, the second sampling transistor is turned on and the signal charges are stored in the second capacitor, and, in a second frame consecutive to the first frame, after the second sampling transistor is turned on and the reset charges are stored in the second capacitor, the first sampling transistor is turned on and the signal charges are stored in the first capacitor.

14. The image sensor of claim 11, wherein, in each frame during a first image capturing operation of the image sensor, after the first sampling transistor is turned on, the second sampling transistor is turned on, and, in each frame during a second image capturing operation following the first image capturing operation, the first sampling transistor is turned on after the second sampling transistor is turned on.

15. The image sensor of claim 11, wherein, in a first frame interval comprising N frames, in each frame, after the first sampling transistor is turned on, the second sampling transistor is turned on, and, in a second frame interval comprising the N frames after the first frame interval, in each frame, the first sampling transistor is turned on after the second sampling transistor is turned on, where N is a positive integer greater than or equal to 2.

16. The image sensor of claim 11, wherein the image sensor further comprises a controller configured to calculate a number of uses of at least one of the first capacitor and the second capacitor, and the order in which the first sampling transistor and the second sampling transistor are turned on is changed based on the number of uses of at least one of the first capacitor and the second capacitor.

17. An image sensor comprising a plurality of pixels, wherein a pixel among the plurality of pixels comprises:

a photo detection circuit comprising a photo diode and configured to generate a pixel signal from photo charges generated by the photo diode; and an analog-to-digital converter configured to convert the pixel signal into a digital signal comprising a pixel value, the photo detection circuit comprises:

a floating diffusion node configured to accumulate photo charges generated by the photo diode;

a first capacitor;

a second capacitor;

a first sampling transistor configured to sample charges from the first capacitor; and a second sampling transistor configured to sample charges from the second capacitor, and wherein the photo detection circuit operates the first capacitor to store one of reset charges according to a voltage of the floating diffusion node and signal charges according to a voltage of the floating diffusion node in which the photo charges are accumulated, operates the second capacitor to store the other one of the reset charges and the signal charges and changes types of charges stored in the first capacitor and the second capacitor, and wherein the types of charges comprise the reset charges and the signal charges.

18. The image sensor of claim 17, wherein the photo detection circuit changes the types of charges stored in the first capacitor and the second capacitor in each frame.

19. The image sensor of claim 17, wherein the types of charges stored in the first capacitor and the second capacitor are different in a first frame interval comprising N frames and a second frame interval comprising the N frames after the first frame interval, wherein N is a positive integer greater or equal to 2.

20. The image sensor of claim 17, wherein, in a given frame, when one of the reset charges and the signal charges is stored in the first capacitor, a voltage difference between both ends of the first capacitor is different from a voltage difference between both ends of the second capacitor when the other one of the reset charges and the signal charges is stored in the second capacitor in the given frame.

* * * * *